US010212880B2

(12) United States Patent
Cmich et al.

(10) Patent No.: US 10,212,880 B2
(45) Date of Patent: Feb. 26, 2019

(54) HIGH-EFFICIENCY CUTTING SYSTEM

(71) Applicant: MTD PRODUCTS INC, Valley City, OH (US)

(72) Inventors: Ryan Cmich, Sharon Township, OH (US); Adam Ference, Westlake, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 15/798,894

(22) Filed: Oct. 31, 2017

(65) Prior Publication Data
US 2018/0064028 A1 Mar. 8, 2018

Related U.S. Application Data

(63) Continuation of application No. PCT/US2017/039315, filed on Jun. 26, 2017.
(Continued)

(51) Int. Cl.
*A01D 34/73* (2006.01)
*A01D 34/81* (2006.01)
(Continued)

(52) U.S. Cl.
CPC ........... *A01D 34/73* (2013.01); *A01D 34/001* (2013.01); *A01D 34/008* (2013.01); *A01D 34/66* (2013.01);
(Continued)

(58) Field of Classification Search
CPC ...... A01D 34/664; A01D 34/73; A01D 34/66; A01D 34/736; A01D 34/826;
(Continued)

(56) References Cited

U.S. PATENT DOCUMENTS 2,245,821 A * 6/1941 Poynter ................. A01D 34/66
30/276
2,529,797 A * 11/1950 Cauble ................. A01D 34/736
56/295
(Continued)

FOREIGN PATENT DOCUMENTS

CN 101541578 A 9/2009
CN 203 912 562 11/2014
(Continued)

OTHER PUBLICATIONS

International Search Report and Written Opinion dated Sep. 21, 2017 for PCT/US2017/039315 filed Jun. 26, 2017.
(Continued)

*Primary Examiner* — Robert E Pezzuto
*Assistant Examiner* — Joan D Misa
(74) *Attorney, Agent, or Firm* — Wegman, Hessler & Vanderburg

(57) ABSTRACT

A high-efficiency cutting system for an autonomous mower provides a multiple blade tip cutting radius for a cleaner cut, and more complete mow. The system includes a spinning blade disk provided within a housing including a vertical standoff. The blade disk includes a first pair of cutting blades located between the center of the blade disk and the circumference of the blade disk, and a second pair of cutting blades located radially inward from the first pair of cutting blades. The cutting blades extend downward and away from the blade disk at an angle.

10 Claims, 33 Drawing Sheets

Related U.S. Application Data

(60) Provisional application No. 62/354,198, filed on Jun. 24, 2016.

(51) Int. Cl.
  *A01D 34/66* (2006.01)
  *A01D 34/82* (2006.01)
  *A01D 34/00* (2006.01)
  *A01D 34/78* (2006.01)
  *A01D 69/02* (2006.01)
  *A01D 101/00* (2006.01)

(52) U.S. Cl.
  CPC .......... *A01D 34/661* (2013.01); *A01D 34/664* (2013.01); *A01D 34/733* (2013.01); *A01D 34/736* (2013.01); *A01D 34/78* (2013.01); *A01D 34/81* (2013.01); *A01D 34/828* (2013.01); *A01D 69/02* (2013.01); *A01D 2101/00* (2013.01)

(58) Field of Classification Search
  CPC ................ A01D 34/008; A01D 34/733; A01D 2101/00; A01D 34/78; A01D 34/81; A01D 34/661; A01D 34/001; A01D 69/02
  See application file for complete search history.

(56) References Cited

U.S. PATENT DOCUMENTS

| | | | |
|---|---|---|---|
| 2,737,772 A | 3/1956 | Jacobsen | |
| 2,876,609 A | 3/1959 | Swanson | |
| 2,888,796 A | 6/1959 | Denney | |
| 2,957,295 A | 10/1960 | Brown | |
| 2,983,057 A * | 5/1961 | Erickson | A01D 42/08 15/328 |
| 3,002,331 A | 10/1961 | Denney | |
| 3,008,283 A | 11/1961 | Wood | |
| 3,010,269 A | 11/1961 | Elliott | |
| 3,029,582 A | 4/1962 | de Halleux | |
| 3,049,854 A | 8/1962 | Denney | |
| 3,085,386 A | 4/1963 | Slemmons | |
| 3,091,906 A | 6/1963 | Hall | |
| 3,097,467 A | 7/1963 | Konrad | |
| 3,129,549 A | 4/1964 | Stauffer | |
| 3,473,306 A | 10/1969 | Ewasko | |
| 3,508,385 A | 4/1970 | Carlson | |
| 3,540,198 A * | 11/1970 | Erickson | A01D 34/404 56/295 |
| 3,555,798 A * | 1/1971 | Eder | A01D 34/66 56/295 |
| 3,563,014 A | 2/1971 | Krewson | |
| 3,621,642 A * | 11/1971 | Leake, Jr. | A01D 34/736 56/295 |
| 4,065,913 A * | 1/1978 | Fisher | A01D 34/4166 56/295 |
| 4,069,651 A | 1/1978 | Steffen | |
| 4,083,166 A * | 4/1978 | Haas | A01D 34/005 56/13.7 |
| D248,474 S * | 7/1978 | Oosterling | D15/29 |
| 4,171,608 A | 10/1979 | Hetrick | |
| 4,189,903 A | 2/1980 | Jackson et al. | |
| 4,205,510 A | 6/1980 | Raniero | |
| 4,205,512 A | 6/1980 | Thorud | |
| 4,214,426 A * | 7/1980 | Lindblad | A01D 34/826 56/17.5 |
| 4,313,297 A | 2/1982 | Maier | |
| 4,407,112 A | 10/1983 | Shepherd et al. | |
| 4,450,673 A | 5/1984 | Hutchison | |
| 4,633,658 A | 1/1987 | Nogawa | |
| 4,711,077 A | 12/1987 | Kutsukake et al. | |
| 4,756,147 A | 7/1988 | Savell | |
| 5,129,217 A | 7/1992 | Loehr | |
| 5,184,451 A | 2/1993 | Savipakka et al. | |
| 5,204,814 A | 4/1993 | Noonan et al. | |
| 5,210,988 A | 5/1993 | Shaifer | |
| D340,462 S | 10/1993 | Cowart | |
| 5,267,429 A | 12/1993 | Kettler et al. | |
| 5,299,414 A | 4/1994 | Long | |
| 5,483,790 A | 1/1996 | Kuhn et al. | |
| 5,491,962 A * | 2/1996 | Sutliff | A01D 34/736 56/12.7 |
| 5,609,011 A | 3/1997 | Kuhn et al. | |
| 5,649,413 A * | 7/1997 | Oostendorp | A01D 34/4168 172/15 |
| 5,782,073 A | 7/1998 | Sheldon | |
| 5,884,463 A | 3/1999 | Darzinskis | |
| 5,960,617 A | 10/1999 | Sheldon | |
| 5,987,863 A | 11/1999 | Busboom et al. | |
| 6,038,842 A | 3/2000 | Quiroga | |
| 6,052,979 A | 4/2000 | Tutschka | |
| 6,065,276 A | 5/2000 | Hohnl et al. | |
| 6,185,920 B1 | 2/2001 | Oxley | |
| 6,286,293 B1 | 9/2001 | Scag et al. | |
| 6,321,515 B1 | 11/2001 | Colens | |
| 6,327,741 B1 | 12/2001 | Reed | |
| 6,339,735 B1 | 1/2002 | Peless et al. | |
| 6,493,613 B2 | 12/2002 | Peless et al. | |
| 6,539,694 B2 | 4/2003 | Oxley | |
| 6,571,544 B1 | 6/2003 | Buss et al. | |
| 6,604,348 B2 | 8/2003 | Hunt | |
| 6,779,328 B2 | 8/2004 | Buss et al. | |
| 6,782,684 B2 | 8/2004 | Buss et al. | |
| 6,892,519 B2 | 5/2005 | Sugden | |
| 6,978,590 B1 | 12/2005 | Graham | |
| 6,996,962 B1 | 2/2006 | Sugden et al. | |
| 7,062,898 B2 | 6/2006 | Sarver et al. | |
| 7,065,946 B2 | 6/2006 | Boeck et al. | |
| 7,079,923 B2 | 7/2006 | Abramson et al. | |
| 7,171,798 B1 * | 2/2007 | Bernardy | A01D 34/73 56/255 |
| 7,299,613 B2 | 11/2007 | Samejima et al. | |
| 7,444,206 B2 | 10/2008 | Abramson et al. | |
| 7,458,199 B2 | 12/2008 | Sarver et al. | |
| 7,594,377 B1 | 9/2009 | Jansen et al. | |
| 7,613,543 B2 | 11/2009 | Petersson et al. | |
| 7,617,665 B2 | 11/2009 | Yamashita et al. | |
| 7,668,631 B2 | 2/2010 | Bernini | |
| 7,685,799 B2 | 3/2010 | Samejima et al. | |
| 7,703,268 B2 | 4/2010 | Yanke | |
| 7,729,801 B2 | 6/2010 | Abramson | |
| 7,769,490 B2 | 8/2010 | Abramson et al. | |
| 7,784,255 B2 | 8/2010 | Moore et al. | |
| 7,988,380 B2 | 8/2011 | Harkcom et al. | |
| 8,046,103 B2 | 10/2011 | Abramson et al. | |
| 8,136,333 B1 | 3/2012 | Levin et al. | |
| 8,171,709 B1 | 5/2012 | Bedford et al. | |
| 8,234,848 B2 * | 8/2012 | Messina | A01D 34/008 56/17.1 |
| 8,239,992 B2 | 8/2012 | Schnittman et al. | |
| 8,428,776 B2 | 4/2013 | Letsky | |
| 8,452,450 B2 | 5/2013 | Dooley et al. | |
| 8,532,822 B2 | 9/2013 | Abramson et al. | |
| 8,600,582 B2 | 12/2013 | Bernini | |
| 8,676,378 B2 | 3/2014 | Tian et al. | |
| 8,776,489 B2 | 6/2014 | Tepe | |
| 8,818,602 B2 | 8/2014 | Yamamura et al. | |
| 8,868,237 B2 | 10/2014 | Sandin et al. | |
| 8,893,461 B2 | 11/2014 | Nikkei | |
| 8,983,693 B2 | 3/2015 | Yamamura et al. | |
| D760,806 S * | 7/2016 | Cmich | D15/14 |
| 9,480,201 B2 | 11/2016 | Maruyama et al. | |
| 9,485,910 B2 | 11/2016 | Lebeau et al. | |
| D776,169 S * | 1/2017 | Cmich | D15/14 |
| D781,349 S * | 3/2017 | Cmich | D15/14 |
| D795,299 S * | 8/2017 | Cmich | D15/17 |
| D795,300 S * | 8/2017 | Cmich | D15/17 |
| D797,530 S * | 9/2017 | Cmich | D8/8 |
| D799,555 S * | 10/2017 | Cmich | D15/14 |
| 9,930,829 B2 * | 4/2018 | Schaedler | A01D 34/003 |
| 9,936,635 B2 * | 4/2018 | Gottinger | A01D 34/733 |
| 2004/0031255 A1 | 2/2004 | Kenny | |
| 2004/0163373 A1 | 8/2004 | Adams et al. | |
| 2004/0237492 A1 | 12/2004 | Samejima et al. | |

(56) References Cited

U.S. PATENT DOCUMENTS

| | | |
|---|---|---|
| 2005/0126152 A1 | 6/2005 | Boeck et al. |
| 2005/0279072 A1 | 12/2005 | Sarver et al. |
| 2006/0150361 A1 | 7/2006 | Aldred et al. |
| 2006/0179809 A1 | 8/2006 | Sarver et al. |
| 2007/0062170 A1 | 3/2007 | Finkner |
| 2007/0193240 A1 | 8/2007 | Nafziger |
| 2007/0234699 A1 | 10/2007 | Berkeley |
| 2007/0273152 A1 | 11/2007 | Kawakami et al. |
| 2007/0289282 A1 | 12/2007 | Yamashita et al. |
| 2008/0072555 A1 | 3/2008 | Samejima et al. |
| 2008/0168756 A1 | 7/2008 | Nafziger |
| 2009/0087257 A1 | 4/2009 | Harkcom et al. |
| 2009/0126330 A1 | 5/2009 | Moore et al. |
| 2009/0266042 A1 | 10/2009 | Mooney et al. |
| 2011/0234153 A1 | 9/2011 | Abramson |
| 2013/0211646 A1 | 8/2013 | Yamamura et al. |
| 2013/0211647 A1 | 8/2013 | Yamamura et al. |
| 2013/0317680 A1 | 11/2013 | Yamamura et al. |
| 2014/0031979 A1 | 1/2014 | Borinato |
| 2014/0058611 A1 | 2/2014 | Borinato |
| 2014/0324269 A1 | 10/2014 | Abramson et al. |
| 2015/0047310 A1 | 2/2015 | Schreiner |
| 2015/0128548 A1 | 5/2015 | Andre et al. |
| 2016/0081269 A1 | 3/2016 | Gottinger et al. |
| 2016/0278287 A1 * | 9/2016 | Kasai .................. A01D 34/736 |
| 2016/0278289 A1 | 9/2016 | Kasai et al. |
| 2016/0345490 A1 * | 12/2016 | Schaedler ............ A01D 34/003 |
| 2017/0006776 A1 | 1/2017 | Svensson et al. |
| 2017/0367257 A1 * | 12/2017 | Cmich ................ A01D 34/008 |

FOREIGN PATENT DOCUMENTS

| | | | |
|---|---|---|---|
| EP | 2648307 A1 | 10/2013 | |
| EP | 2656718 A1 | 10/2013 | |
| EP | 2852029 A1 | 3/2015 | |
| FR | 1519808 A * | 4/1968 | ............ A01D 34/63 |
| FR | 2 282 780 A1 | 3/1976 | |
| FR | 2331949 A1 * | 6/1977 | ........... A01D 34/736 |
| FR | 2644971 | 10/1990 | |
| FR | 2733115 A1 * | 10/1996 | ........... A01D 34/736 |
| GB | 829393 A | 3/1960 | |
| GB | 1 326 900 | 8/1973 | |
| GB | 1 460 225 | 12/1976 | |
| GB | 1478780 A * | 7/1977 | ........... A01D 34/736 |
| GB | 2307163 | 5/1997 | |
| GB | 2 310 993 | 9/1997 | |
| GB | 2369765 A * | 6/2002 | ........... A01D 34/736 |
| JP | S61 136836 | 8/1986 | |
| JP | 09028154 A * | 2/1997 | ........... A01D 34/736 |
| JP | 3966834 B2 * | 8/2007 | ............. A01D 34/73 |
| JP | 2013162764 A * | 8/2013 | ............. A01D 34/82 |
| WO | WO 88/04135 A1 | 6/1988 | |
| WO | WO-9323986 A1 * | 12/1993 | ........... A01D 34/005 |
| WO | 2002/051241 A1 | 7/2002 | |
| WO | 2006135952 A1 | 12/2006 | |
| WO | 2008116422 A1 | 2/2008 | |
| WO | 2012036572 A2 | 3/2012 | |
| WO | WO-2012036572 A2 * | 3/2012 | ........... A01D 34/733 |
| WO | WO-2013077413 A1 * | 5/2013 | ............. A01D 34/73 |
| WO | WO 2014127212 A1 | 8/2014 | |
| WO | 2015115955 A1 | 8/2015 | |

OTHER PUBLICATIONS

International Search Report and Written Opinion dated Aug. 8, 2016 for PCT/US2016/036055 filed Jun. 6, 2016.

International Search Report and Written Opinion for PCT/US2016/034531 dated Sep. 8, 2016.

* cited by examiner

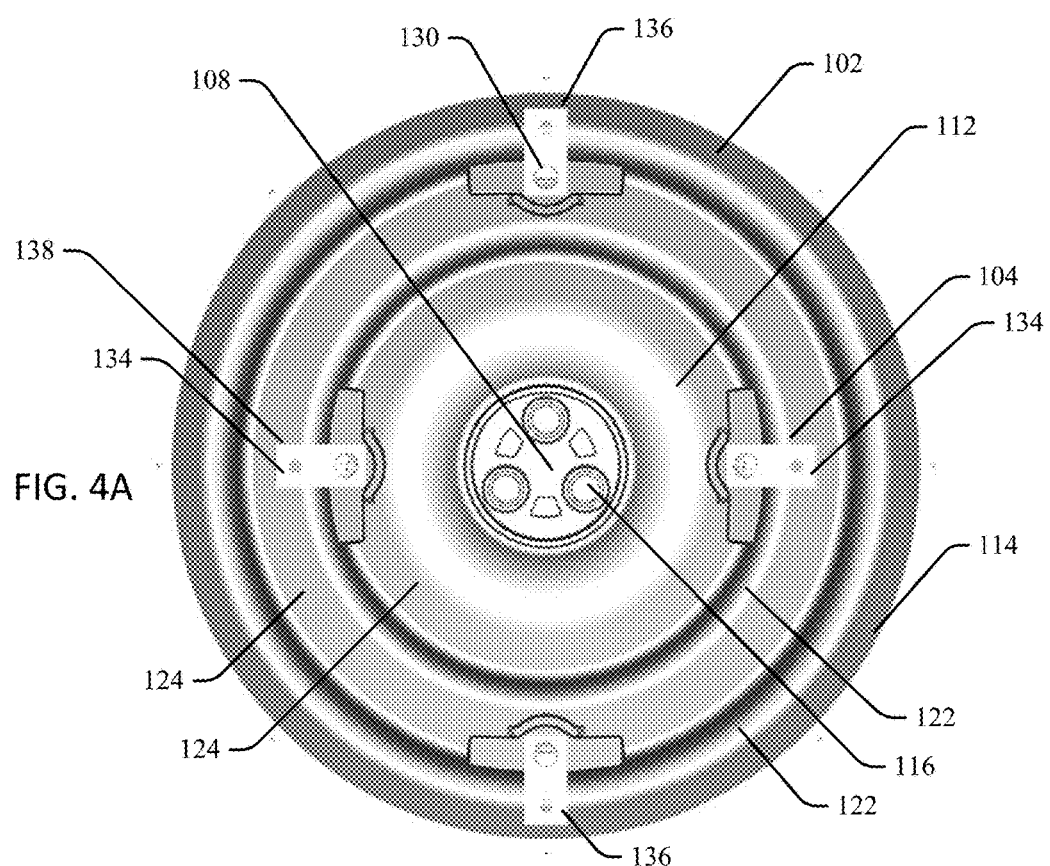
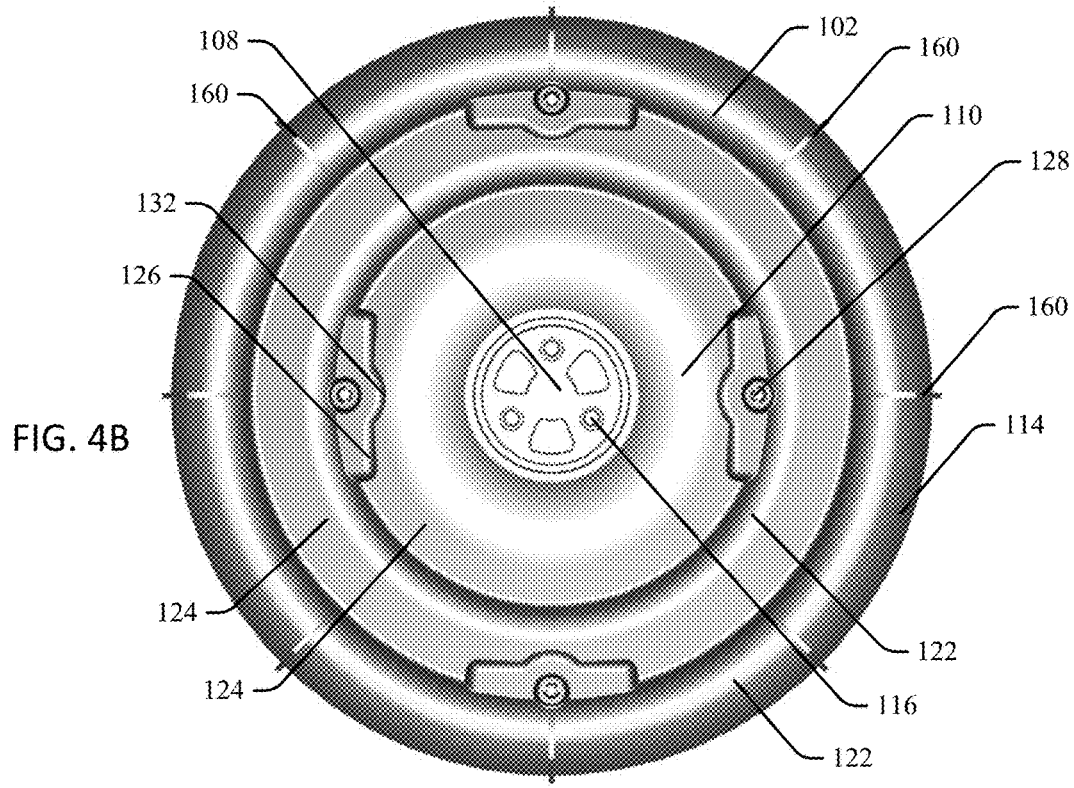

HIGH-EFFICIENCY CUTTING SYSTEM

CROSS REFERENCE TO RELATED APPLICATIONS

This application is a continuation of, and claims the priority filing benefit of, International PCT Application PCT/US2017/039315 filed Jun. 26, 2017, and U.S. Provisional Patent Application Ser. No. 62/354,198 filed Jun. 24, 2016. Each of the above listed applications is incorporated herein by reference.

FIELD OF THE INVENTION

This disclosure relates generally to cutting systems for use in lawn mowers, and in particular but not exclusively, to high-efficiency cutting systems for autonomous mowers.

BACKGROUND OF THE INVENTION

Battery operated machines and tools, in general, face challenges when it comes to producing enough power to accomplish a task completely and efficiently while complying with size, weight and cost constraints. Many tasks can be easily handled utilizing conventional combustion engines that provide high torque forces, however, environmental and economic concerns are increasing the demand for tools that use quieter, cleaner running electric motors.

Conventional battery powered autonomous mowers sometimes struggle to deliver the desired performance, especially when encountering poor conditions, such as wet grass or deep grass. This is due largely to the difficulty of producing enough force to maintain an adequate blade speed.

Traditional autonomous mowers have sought to address this problem by selective scheduling of mows, and more frequent mowing, so as to remove less of the grass blade each time, and by providing larger electric motors which require additional batteries, and in some instances, additional battery charging time. These approaches have met with mixed results, and tend to increase wear and tear on the autonomous mower, as well as negatively impact the size, weight and cost of the autonomous mower.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

In an embodiment, a high-efficiency cutting system for an autonomous mower includes at least one blade disk having a central portion, a top side, a bottom side, and an outer circumference, a first pair of cutting blades pivotably mounted on the bottom side of the blade disk between the central portion and the circumference of the blade disk, and extending away from the blade disk at an angle and a second pair of cutting blades pivotably mounted on the bottom side of the blade disk closer to the central portion than the first pair of cutting blades, and extending from the blade disk at an angle.

In one embodiment, a high-efficiency cutting system for an autonomous mower includes a housing having an outer circumference and an open lower portion, at least one rotating blade disk provided within the housing and having a central portion, a top side, a bottom side, and a peripheral edge, a first pair of cutting blades pivotably secured to the bottom side of the blade disk between the central portion of the blade disk and the blade disk peripheral edge, and extending away from the blade disk at an angle, and a second pair of cutting blades pivotably secured to the bottom side of the blade disk radially inward and offset from the first pair of cutting blades, and extending away from the blade disk at an angle.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The features of the disclosure, and their advantages, are illustrated specifically in embodiments of the invention now to be described, by way of example, with reference to the accompanying diagrammatic drawings, in which:

FIGS. 4A, 4B, 4C, 4D, 4E, 4F, 4G, 4H, 4I, 4J and 4K are illustrations of example blade disks for a high-efficiency cutting systems for autonomous mowers in accordance with an aspect of the disclosure;

Figure 1A:
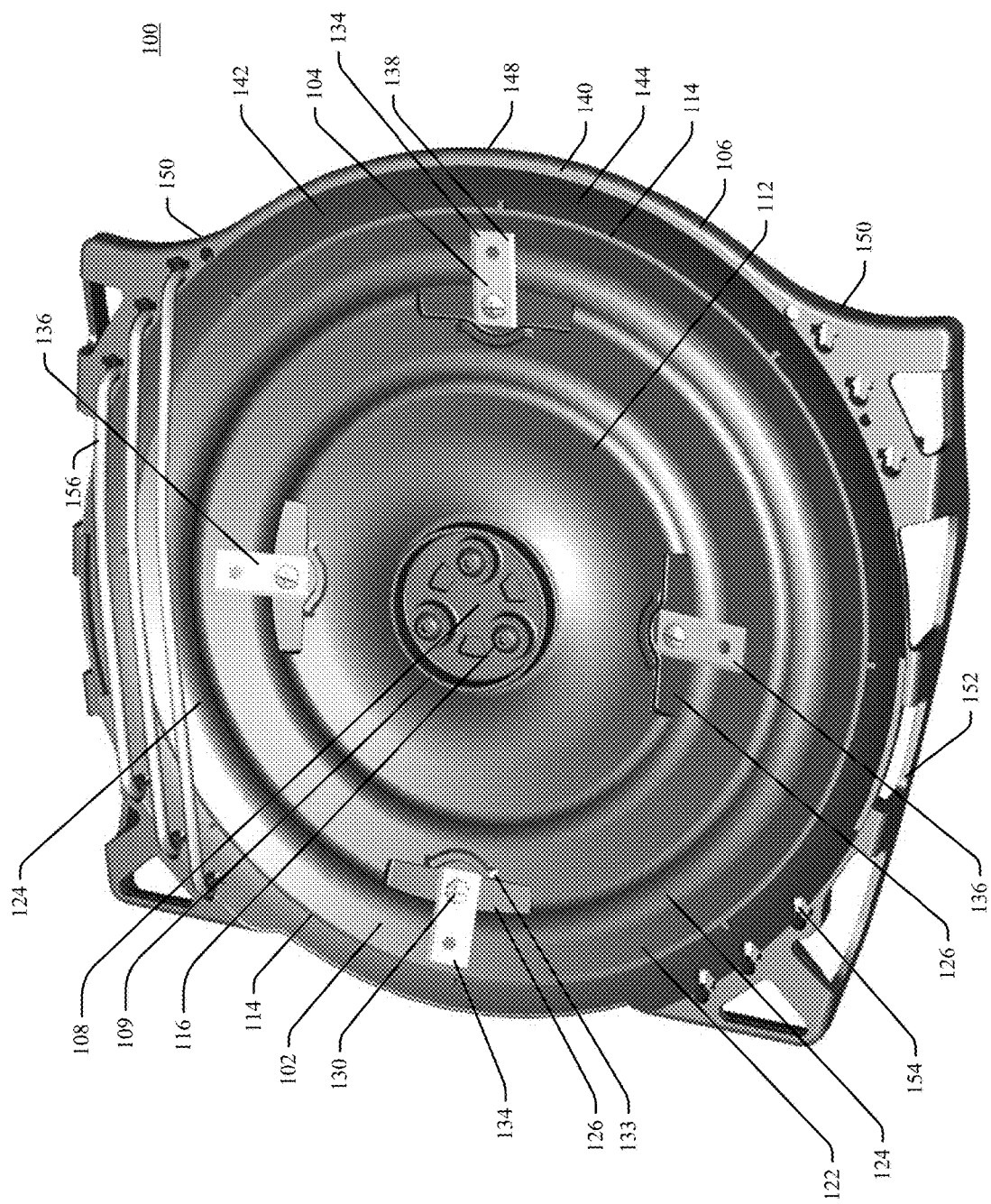
FIGS. 1A, 1B, 1C, and 1D are illustrations of example high-efficiency cutting systems for an autonomous mower in accordance with aspects of the disclosure.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

Embodiments of a system, apparatus, and method of operation for a high-efficiency cutting system are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein, the term "autonomous mower" refers to an autonomous robot, or most any autonomous device or machine that performs various tasks and functions including lawn mowing, lawn maintenance, vacuum cleaning, floor sweeping, and the like.

As used herein, the term "disk" refers to any structure of generally rounded and relatively flattened configuration, and can include structures having a perimeter which, while following a generally rounded path, can also be comprised of one or more straight or curved segments as shown and described herein.

Figure 2A:
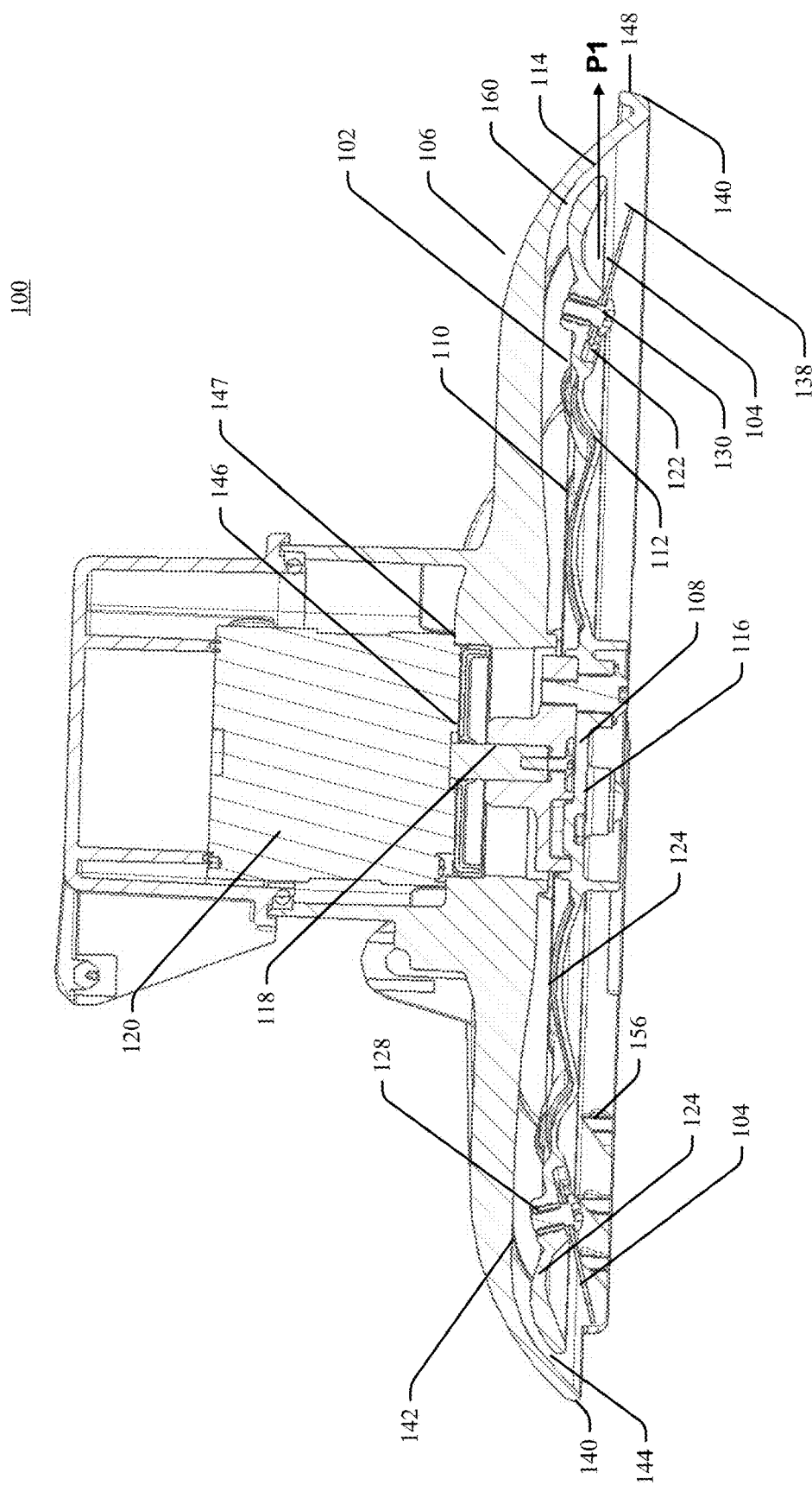
FIGS. 2A, 2B, 2C, and 2D are illustrations of example cross-sectional views of high-efficiency cutting systems in accordance with aspects of the disclosure.
Figure 2B:
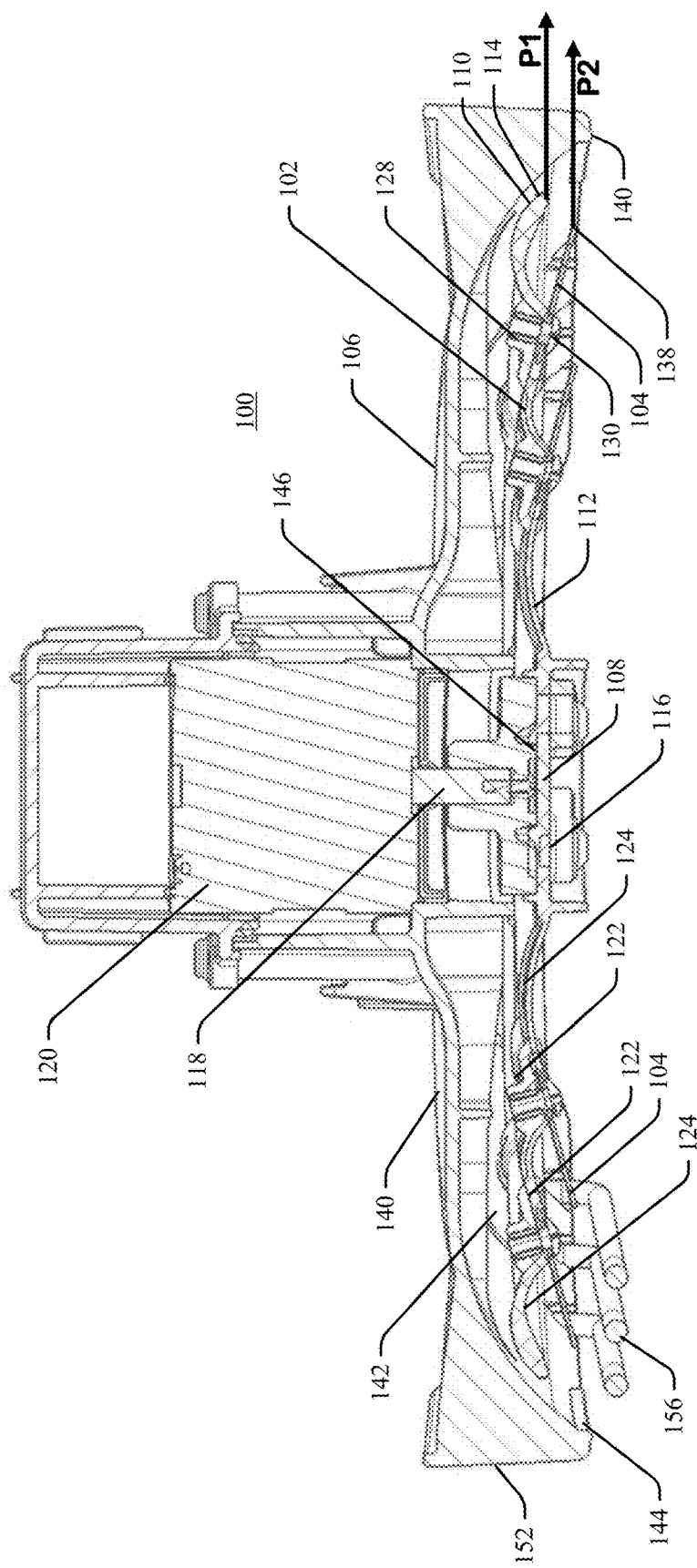
Figure 2C:
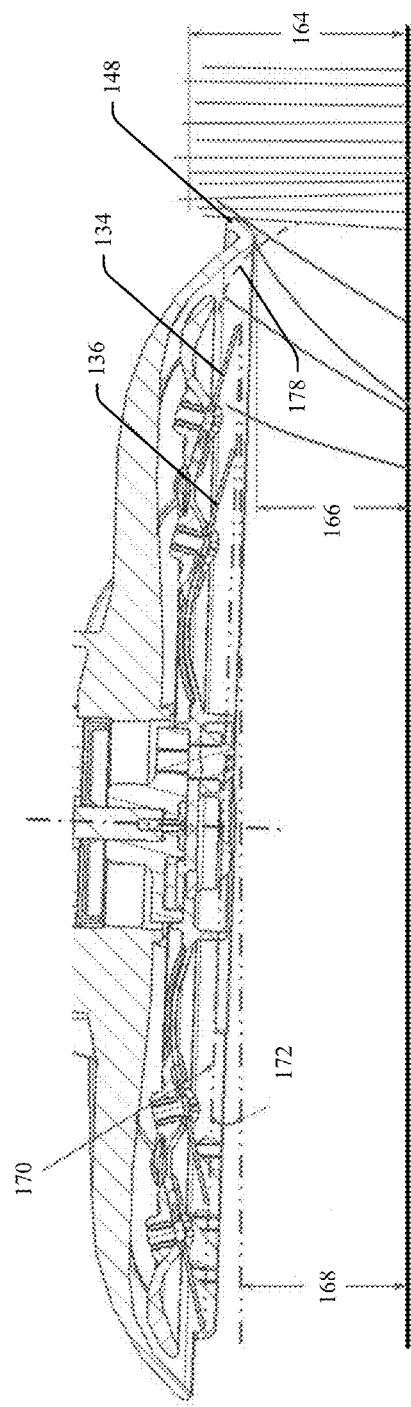

For purposes of description herein, the terms "upper", "lower", "top", "bottom", "upward", "downward", and derivatives thereof, shall relate to the high-efficiency cutting system as oriented in the cross-sectional view shown in FIGS. 2A-2C.

In an embodiment, a cutting system for an autonomous mower includes a housing including an open lower portion, at least one blade disk, provided within the housing and having a central portion, a top side, a bottom side, and an outer circumference, a first pair of cutting blades pivotably mounted on the bottom side of the blade disk between the central portion of the blade disk and the circumference of the blade disk, and extending away from the blade disk at an angle, a second pair of cutting blades pivotably mounted on the bottom side of the blade disk radially inward and offset from the first pair of cutting blades, and extending away from the blade disk at an angle.

Referring to FIGS. 1A-1D, exemplary embodiments of a cutting system 100 for an autonomous mower are shown. The cutting system 100 includes a blade disk 102, a plurality of blades 104 operatively connected to the blade disk 102, and a housing 106. In an embodiment, the blade disk 102, and the housing 106, are formed of a plastic material, but it should be understood by one having ordinary skill in the art that any other material having sufficient structural rigidity, and able to withstand the wear-and-tear due to the operation thereof is acceptable.

In an embodiment, the blade disk 102 is a non-flat or non-planar member having a generally circular, saucer-shape wherein the opening of the saucer-shape is directed downwardly. The blade disk 102 includes a planar central portion 108, a top side 110, a bottom side 112, and a peripheral edge 114. The central portion 108 is a substantially flat and generally circular portion that is centrally located. The central portion 108 includes at least one attachment aperture 116 formed through the thickness thereof. A substantially smooth cylindrical portion of the central forms a collar 109 and provides a undisrupted area, for example, to aid in making smooth contact with stationary rigid objects. The cylindrical area is less likely to catch or bind on raised portions of a docking or charging station, or on other raised areas in the work surface.

The blade disk bottom side 112 includes a plurality of concentric, circular raised portions 122 at increasing radii outward from the central portion 108. The raised portions 122 are connected by generally C-shaped curved portions 124. The blade disk bottom surface 112 can include a number of generally C-shaped curved portions 124 that extend vertically above a plane P1 defined by the bottom surface of the central portion 108 (as shown and described in detail in FIG. 2A).

The curved portions 124 are separated by concentric raised portions 122. An outer raised area forms the peripheral edge 114 of the blade disk 102. The concentric raised portions 122 extend generally as far as the plane P1. In an embodiment, the blade disk peripheral edge 114 extends vertically below the plane P1, and below the raised portions 122. In further embodiments, the blade disk peripheral edge 114 extends as far as the plane P1, and as far the raised portions 122. The radius of curvature of the curved portions 124 can vary between embodiments, and some embodiments may not include the curved portions 124, but the portions 124 can be sloped or otherwise angle downwardly from the central portion 108.

Figure 1B:
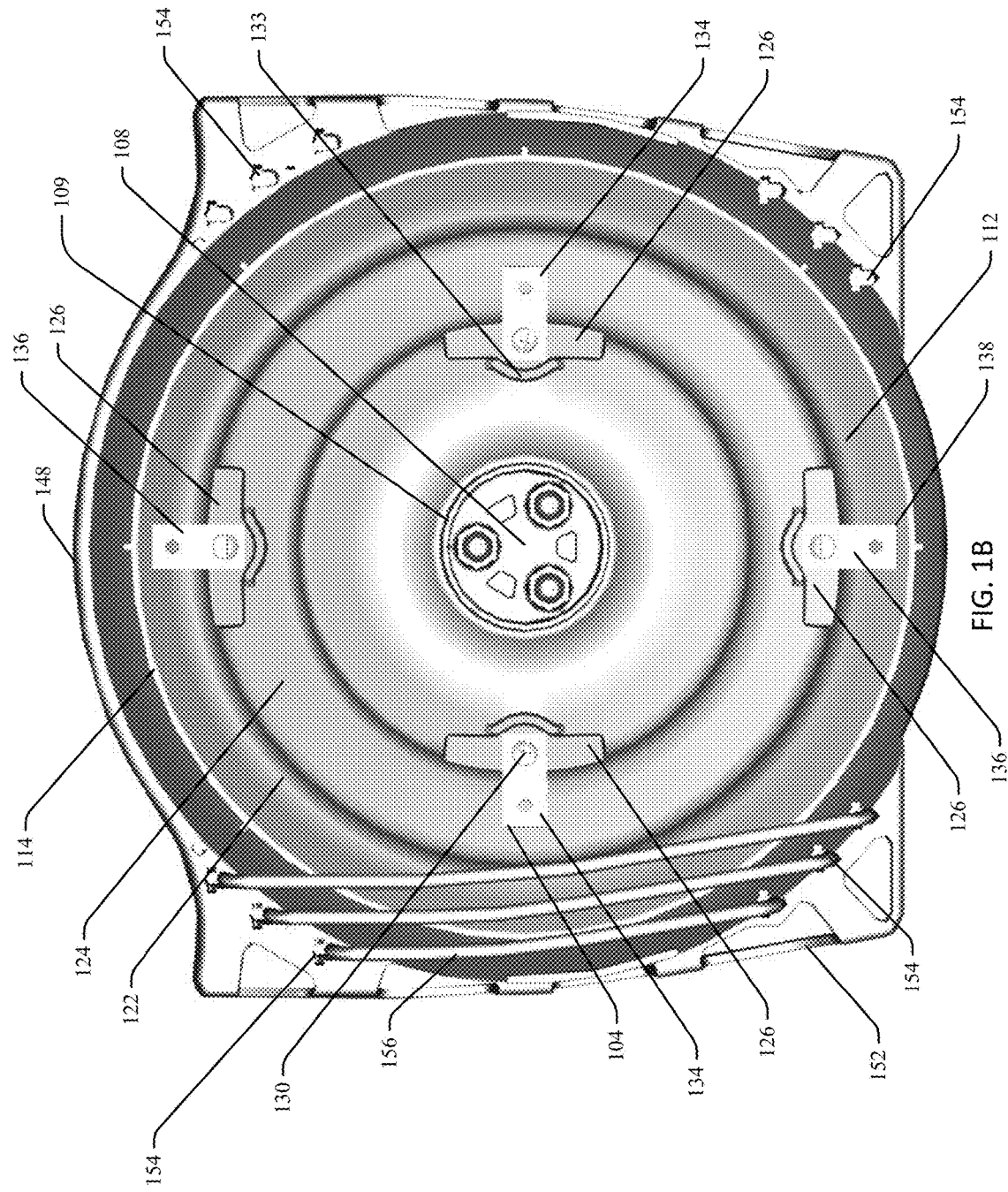

As shown in FIGS. 1A and 1B, a plurality of blade mount recesses 126 are formed in the bottom surface of the blade disk 102. In an embodiment, the blade mount recess 126 comprises a generally rectangular recessed area having opposing side walls along the shorter sides, and one open longer side oriented toward the blade disk peripheral edge 114. A second long side includes a sidewall and is oriented toward the blade disk central portion 108. The second long side of the blade mount recess 126 includes a semi-circular raised portion 133 located generally at the midpoint of the blade mount recess 126. The blade mount recess 126 includes an opening 128 for receiving a blade attachment mechanism 130. The blades 104 are pivotably secured to the bottom surface of the blade disk 112, at least partially within the blade mount recess 126, via the blade attachment mechanism 130.

Figure 1C:
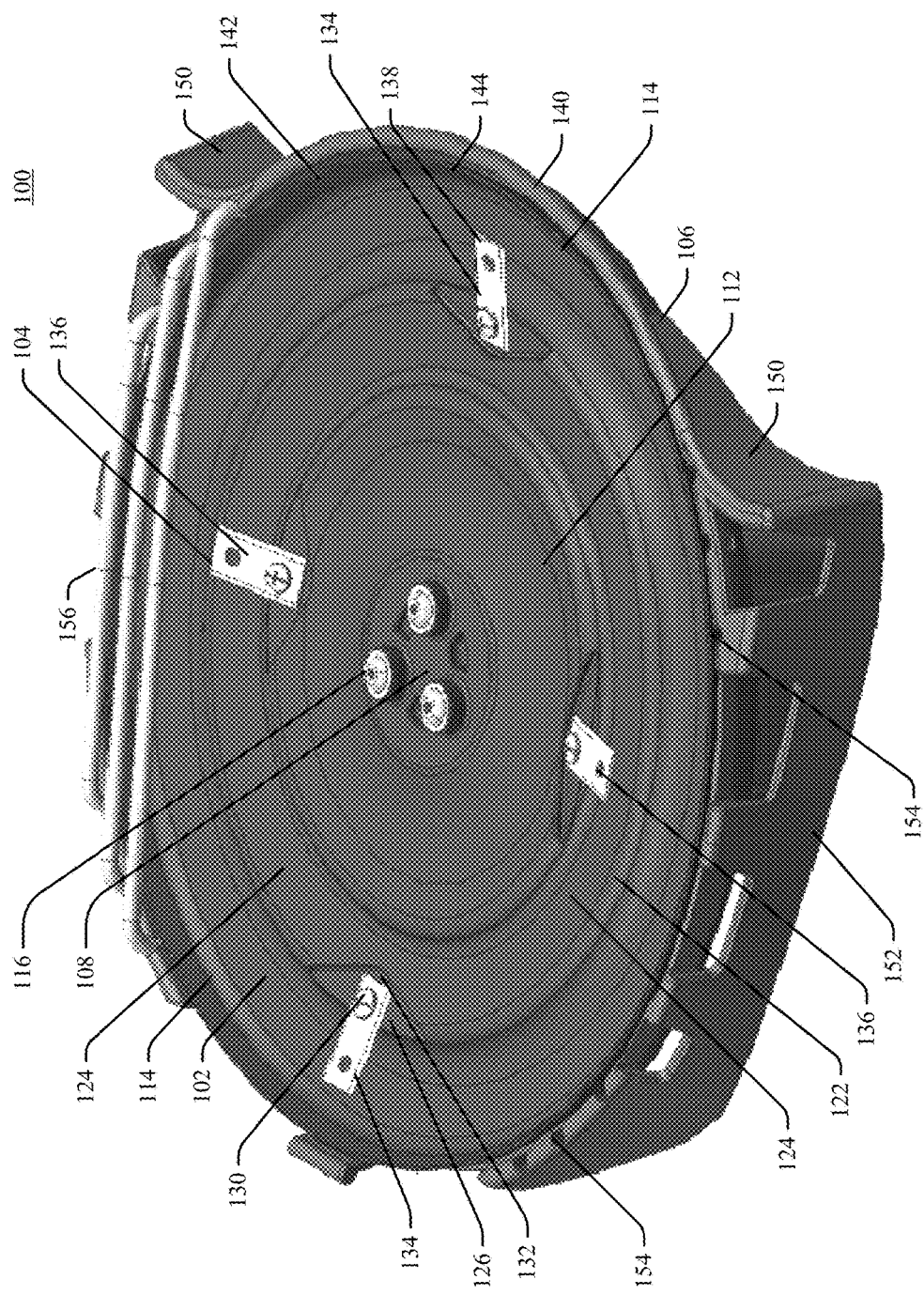
Figure 1D:
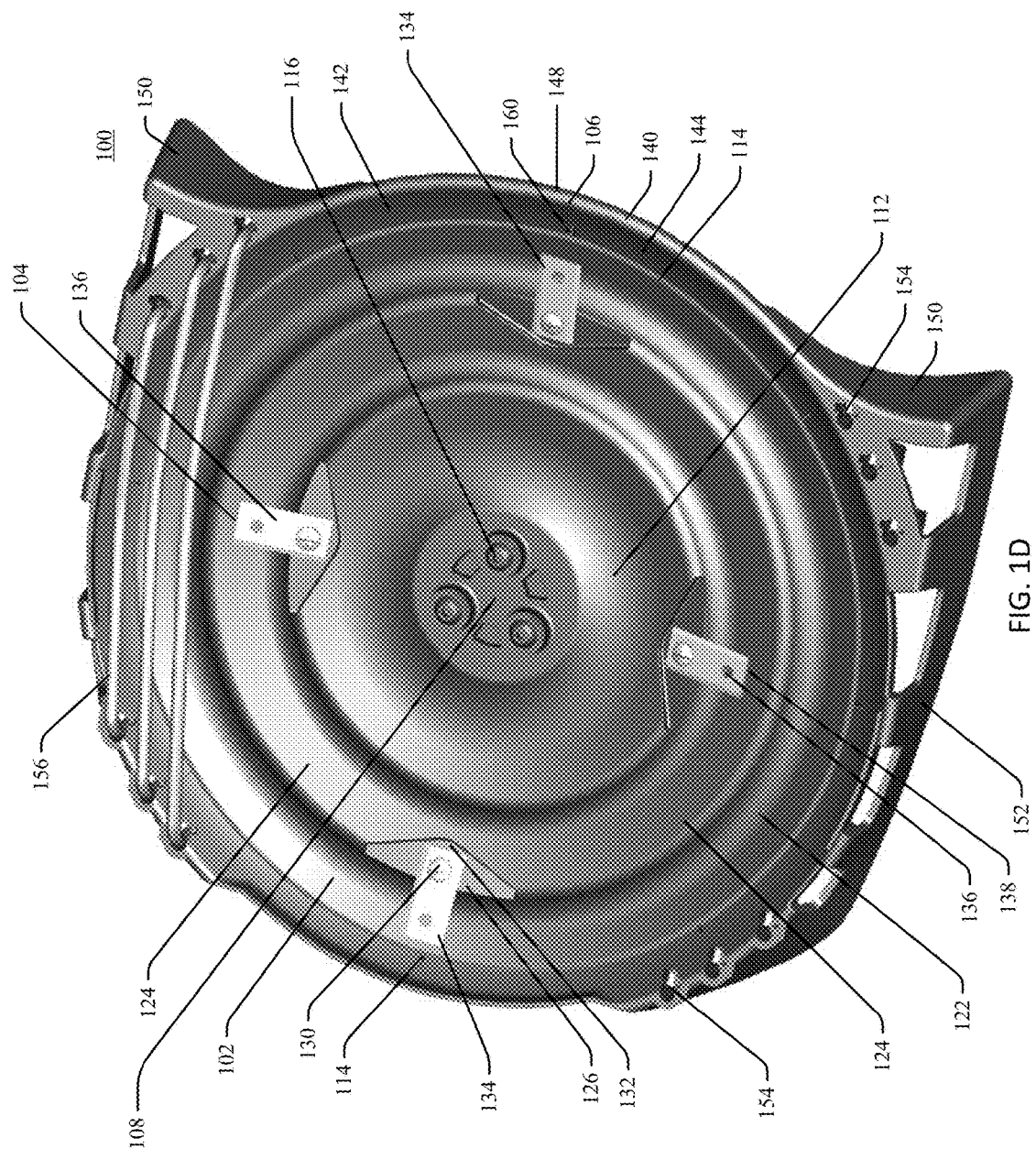

As shown in FIGS. 1C and 1D, a plurality of blade mount recesses 126 are formed in the bottom surface of the blade disk 102, the blade mount recess 126 comprises a generally v-shaped or wedge-shaped open area having an apex, or closed end, toward the blade disk central portion 108, and a wider open end toward the blade disk peripheral edge 114. The blade mount recesses 126 include a generally planar, sloped top area 132 and opposing sidewalls. The blade mount recess top area includes an opening 128 for receiving a blade attachment mechanism 130. The blades 104 are pivotably secured to the bottom surface of the blade disk 112, at least partially within the blade mount recess 126, via the blade attachment mechanism 130.

The size and shape of the blade mount recess 126 allows for lateral movement of the blade 104, e.g. a swing-blade motion, as the blade 104 pivots about the attachment mechanism 130. The blades 104 are capable of side-to-side motion, for example, when encountering an object or obstruction. The sidewalls of the blade mount recess 126 can act as stops, allowing the blades 104 to pivot in about a 70 degree arc to a 180 degree arc. In an embodiment, the stops are positioned so as to contact the cutting edge of the blade 104 at approximately mid-length where minimal grass cutting is performed so as to protect the important cutting portions of the blade edge. It should be understood by one having ordinary skill in the art that although the exemplary embodiments illustrated in FIGS. 1A-1D include pivotably mounted blades 104 capable of lateral movement, a fixed blade or blades can also be used.

The top area 132 of the blade mount recess 126 is a generally planar, sloped surface pitched downward toward the blade disk peripheral edge 114. When installed, the blades 104 extend down and away from the blade disk central portion 108 at an angle determined by the top area 132 of the blade disk recess 126. The blades 104 are held in position at a downward angle relative to horizontal.

In an embodiment, the blades 104 extend at an angle of about 5 degrees to 45 degrees relative to horizontal. An optimal angle can be determined as a function of the blade 104 tip length, and the height of the blade attachment mechanism 130. In one embodiment, the blades 104 extend at an angle of about 20 degrees relative to horizontal. In another embodiment, the blades 104 project downwardly from the bottom surface of the blade disk at about a 15 degree angle.

The downward angle of the blades 104 contributes to the efficiency of the blade disk 102 during mowing, and reduces the rotational loading, or drag, caused by uncut grass blades brushing against the spinning blade disk 102, blades 104, and blade attachment 130. The downward angle of the blades 104 has also been shown to be effective in reducing grass and debris build-up on and around the pivoting area of the blade attachment 130.

In an embodiment, and as shown in FIGS. 1A-1D, a first pair of blade disk recesses 126 are formed in the blade disk bottom surface 112 at positions about 180 degrees relative to each other, and between the blade disk central portion 108 and the blade disk peripheral edge 114. A second pair of blade disk recesses 126 are formed in the blade disk bottom surface 112 at positions about 180 degrees relative to each other, and between the blade disk central portion 108 and the first pair of blade disk recesses 126. The first pair of blade disk recesses 126 can be located orthogonally to the second pair of blade disk recesses 126.

In an exemplary embodiment, a high-efficiency cutting system includes blades 104 pivotably secured to the bottom surface 112 of the blade disk 102 utilizing blade attachment mechanisms 130, and located at least partially within a corresponding blade mount recess 126. The blade disk 102 includes at least a first pair of cutting blades 134, aligned at 180 degrees to one another around a central portion 108, the tips of the blades 138 forming a circular cutting range as they rotate. A second pair of cutting blades 136, aligned at 180 degrees to one another, and at 90 degrees to the first pair of cutting blades 134, rotate around the same central portion 108, the tips 138 of the second cutting blades 136 forming a second circular cutting range.

An exemplary cutting system 100 includes a first and second pair of cutting blades 134, 136, and can include most any number of blades 104 and/or blade pairs 134, 136, secured to the blade disk 102. The quantity and arrangement of the blades 104 can be easily modified to optimize the grass cutting quality of the blade disk 102 for different blade disk sizes and applications.

The blades 104 can be secured to the blade disk 102 via the blade attachment mechanism 130 which also serves as a pivot point allowing lateral movement of the blade 104. It should be understood by one having ordinary skill in the art that although the some of the exemplary embodiments shown and described include pivotably mounted blades 104 capable of lateral movement, fixed blades can also be used.

In an embodiment, each blade 104 is formed as a generally flat, rectangular member whose longitudinal edges have been sharpened. The blades 104 can include multiple cutting surfaces and multiple apertures for mounting the blade 104 to the blade disk 102. For instance, the blades 104 can be reversible and/or bidirectional providing, for example, four cutting surfaces per blade 104. When a blade cutting surface has become worn, the blade 104 can be removed from the blade disk 102 and flipped end for end, and/or side for side, and reattached to the blade disk 102. The opposing side cutting edges of the blades 104 can also be utilized by reversing the direction of the spinning blade disk 102. Periodically reversing the direction of the spinning blade disk 102 can also help minimize grass clipping build-up trends, and produces a debris clearing effect as any lodged debris is impacted by newly cut grass clipping from a different angle.

In embodiments, the first pair of cutting blades 134 are secured to the blade disk 112 at about 180 degrees relative to each other. The first pair of cutting blades 134 are located generally between the central portion 108 of the blade disk 102 and the peripheral edge 114 of the blade disk 102. The second pair of cutting blades 136 are secured to the blade disk 112 at about 180 degrees relative to each other, and at about 90 degrees relative to the first pair of cutting blades 134. The second pair of cutting blades 136 are located radially inward and offset from the first pair of cutting blades 134.

Turning to FIGS. 2A-2D, a generally bowl-shaped housing 106 having a downwardly directed outer circumference 140 and an open lower portion 142 is provided. The housing 106 is similar in size and shape, and incrementally larger than, the blade disk 102, such that the blade disk 102 can nest inside, e.g. lie in close proximity to, the housing 106. The outer circumference 140 of the housing 106 lies in close proximity to the blade disk peripheral edge 114.

In an embodiment, the outer circumference 140 of the housing 106 substantially surrounds, and extends slightly below, the blade disk peripheral edge 114. The opening 144 between the peripheral edge 114 of the blade disk and the outer circumference 140 of the housing 106 is minimized to prevent or reduce the circulation and collection of grass clippings, dirt and debris between the housing 106 and the blade disk 102. In an embodiment, the opening 144 between the peripheral edge 114 of the blade disk 102 and the outer circumference 140 of the housing 106 can be about 2 mm to about 8 mm.

As shown in FIGS. 2A-2C, the blade disk bottom side 112 includes a plurality of concentric, circular raised portions 122 at increasing radii outward from the central portion 108. The raised portions 122 are connected by generally C-shaped curved portions 124. The blade disk bottom surface 112 can include a number of generally C-shaped curved portions 124 that extend vertically above a plane, as indicated by the arrow P1, and defined by the bottom surface of the central portion 108.

The curved portions 124 are separated by two concentric raised portions 122. An outer raised area forms the peripheral edge 114 of the blade disk 102. As shown in FIG. 2A, the concentric raised portions 122 extend generally as far as the plane P1. The blade disk peripheral edge 114 extends generally as far as the plane P1. In embodiments, and as shown in FIG. 2A, the concentric raised portions 122 extend generally as far as the plane P1. The blade disk peripheral edge 114 extends generally as far as the plane P1.

Figure 2D:
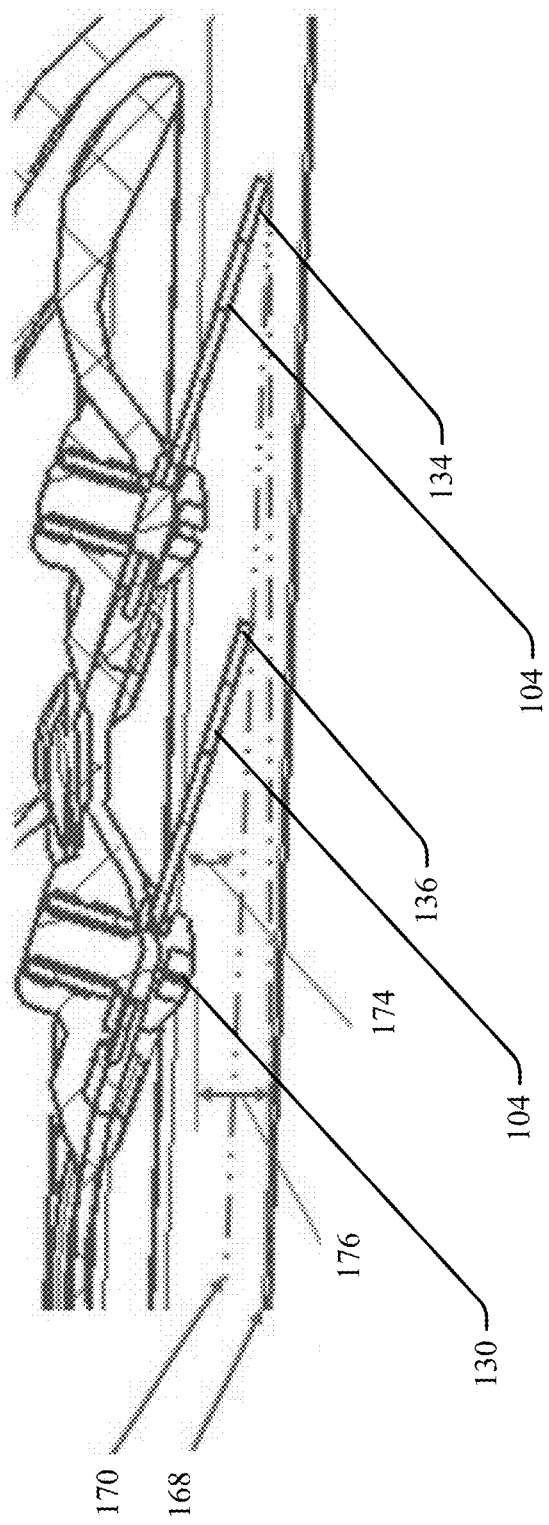
Figure 3A:
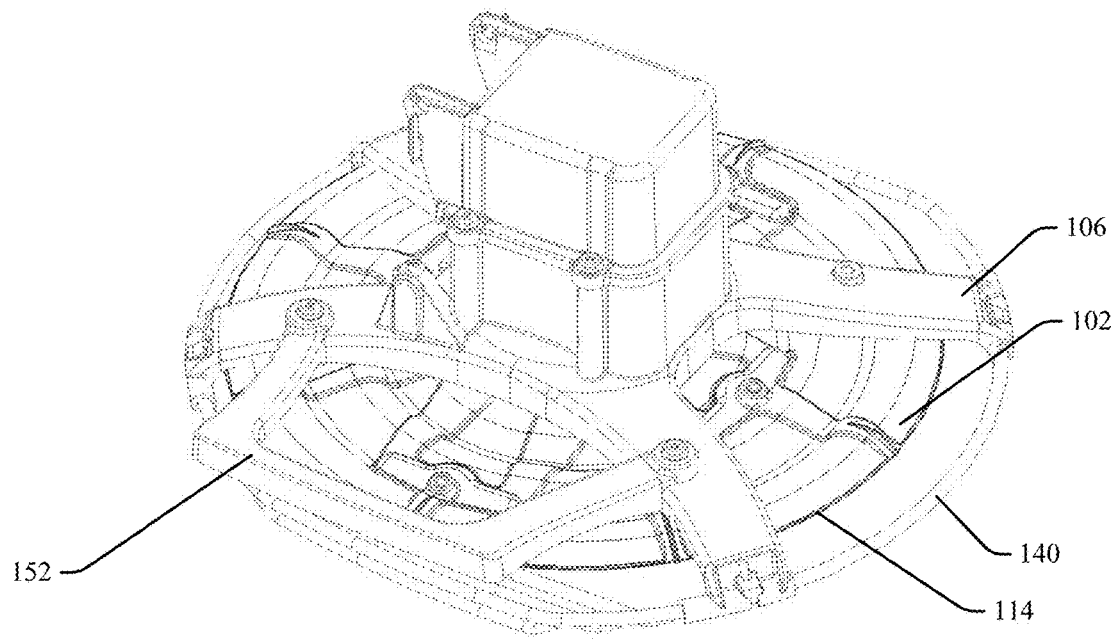
FIGS. 3A, 3B, 3C, and 3D are illustrations of example high-efficiency cutting systems in accordance with an aspect of the disclosure.
Figure 3B:
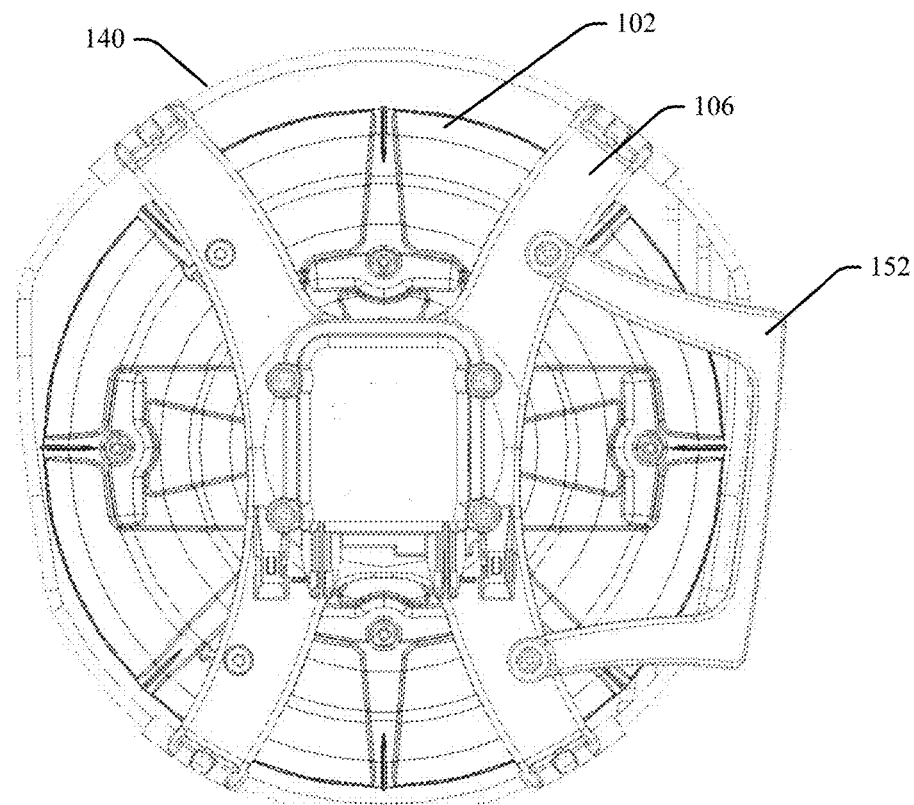
Figure 3C:
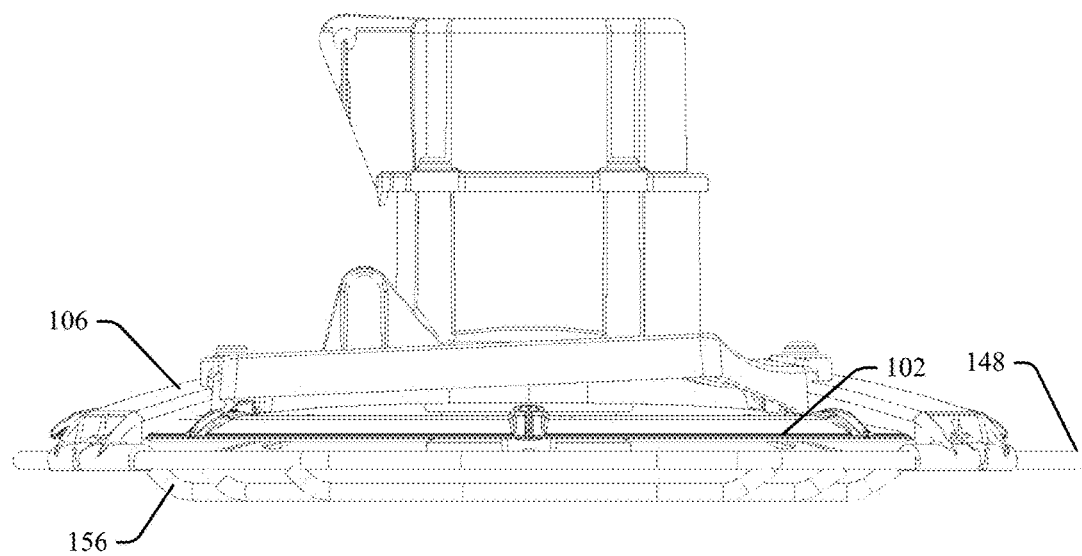
Figure 3D:
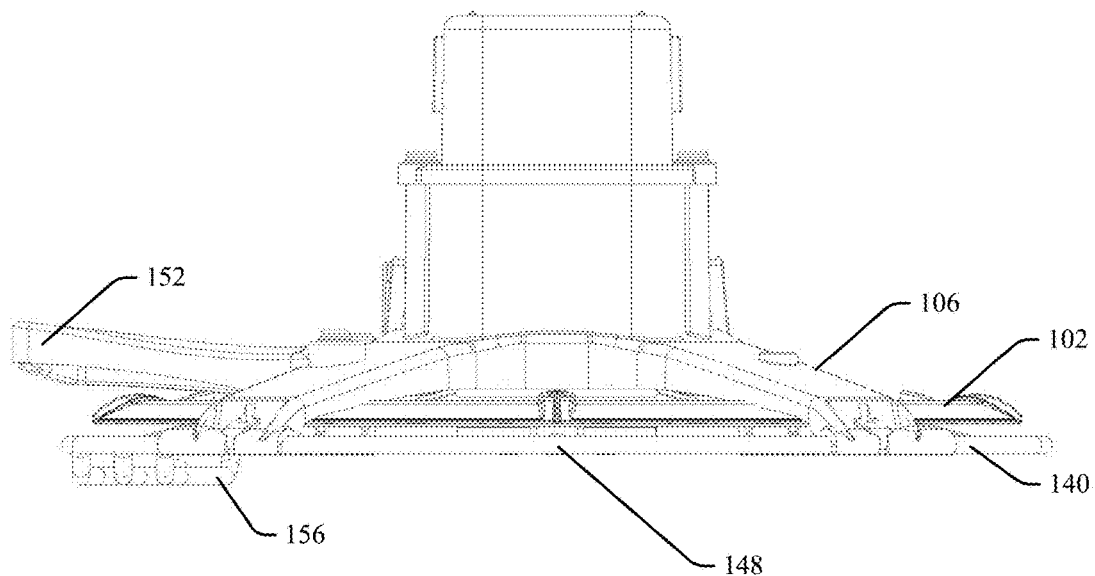

Referring to FIGS. 2B, 2C and 2D, for the purposes of illustrating the relation of the radius between the blade tip pairs 134, 136, two blade disk assemblies 102 are shown overlaid and rotated approximately 90 degrees.

In embodiments, and as shown in FIG. 2B, the plane P2 can be defined by the edges of the pitched blade tips 138. The blade disk peripheral edge 114 extends vertically to the plane P2, and below the raised portions 122 and the curved portion 124 of the blade disk 102.

The radius of curvature of the curved portions 124 can vary between embodiments, and some embodiments may not include the curved portions 124, and the portions 124 can be sloped or otherwise angle downwardly from the central portion 108.

The guards 156 can be mounted to the housing 106 and positioned adjacent to the blade disk 102. A plurality of blade mount recesses 126 are formed in the bottom surface of the blade disk 102. The blades 104 are pivotably secured to the bottom surface of the blade disk 112, at least partially within the blade mount recess 126, via the blade attachment mechanism 130. The pitched blade tips 138 help minimize clogging and clumping of cut grass blades on the blades 104, on the blade disk 102, and the housing 106.

In one example, the autonomous mower 500 can be configured to support an electric motor 120 and at least one battery (not shown). The electric motor 120 includes an output shaft or rotatable spindle 118 that extends through the housing 106 where it connects to the attachment aperture 116 of the blade disk 102. The spindle 118 is configured to enable attachment of the blade disk 102 to the autonomous mower 500, which allows rotation of the spindle 118 to be transferred to the blade disk 102. At least one battery provides electrical power to the electric motor 120, which is then converted to rotational motion of the spindle 118, and rotation of the blade disk 102.

The blade disk 102 is mechanically coupled to the electric motor 120 and arranged to provide a blade tip speed of up to about 96.5 m/sec. It is to be understood that the design of the blade disk 102 can be scalable to larger or smaller needs. For example, a larger autonomous mower 500 may require a larger blade disk 102, or even a plurality of smaller blade disks 102. When scaling the design, a mathematical relationship between the optimal number of blades 104 and the diameter of the blade disk 104 can be calculated.

The housing 106 is mounted to the autonomous mower 500 and includes a centrally located aperture 146 that lines up with attachment apertures 116 on the blade disk 102. The spindle 118 of the motor 120 extends through the housing aperture 146 and is attached to the blade disk 102. In operation, the housing 106 remains stationary as the blade disk 102, driven by the spindle 118 of the motor 120, rotates. In an embodiment, the housing 106 includes one or more motor pilot guides 147 for maintaining a consistent placement and spacing of the motor 120 relative to the housing 106 and the blade disk 102.

In an embodiment, the cutting system 100 can be mounted to an autonomous mower 500 at an angle relative to horizontal. For example, the cutting system 100 can be mounted at a forward down pitch or angle of about zero to five degrees from horizontal. In aspects, the front side of the cutting system 100 is mounted at a two degree angle, and is pitched downward relative to horizontal. That is, the cutting system 100 is mounted such that the front facing side 148 of the housing 106, and the corresponding portion of the blade disk 102, are angled downward and are closer to the ground than the rear facing side of the housing 106. The slight downward pitch of the cutting system 100 can help reduce clogging and clumping of cut grass blades on the underside of the cutting unit 100. The slight downward pitch of the cutting system 100 also helps to reduce drag between the rear portion of the blade disk 102 and the remaining turf grass to be cut.

Referring to FIGS. 2A-2D, the housing 106 includes a vertical standoff 152. The vertical standoff 152 can include a selectively thickened area that provides strength in desired locations of the housing 106. In an embodiment, the vertical standoff 152 comprises an outer portion of the housing 106. The vertical standoff 152 provides sufficient rigidity to prevent movement or deformation of the housing 106 when external pressure is applied, thereby maintaining a distance between the housing 106 and the blades 104 in compliance with applicable safety standards. The size, shape, height, thickness and placement of the vertical standoff 152 can be configured so as to work together with a corresponding mower body 502 including standoffs 504 (as shown, for example, in FIGS. 10A-10B).

As shown in FIGS. 2C and 2D, grass blades that have been pushed downward by the front facing side 148 of the housing 106 and/or the leading edge of the mower body 502, tend to stand up or spring back at different points during the mowing operation following a general arc 178 as shown. The point at which the grass blades tend to stand up is influenced by many factors including the type of grass, the height of the uncut grass 164, the moisture content of the grass blades, the height of the housing relative to the ground 166, and other factors. During a mowing operation, the grass blades contact the leading edge of the housing 106 and are pushed forward as shown in FIG. 2C. As the grass blades stand up along arc 178, in returning to a vertical position, the grass blades are cut by the first set of blades 134 at an established cut plane 168. Any portion of the grass blades extending above the cut plane 168 of the blade pairs 134 is cut by the second set of blades 136 as the grass blades continue their return to a substantially vertical position.

In an embodiment, the cut plane 168 is established by a user, for example, the mowing height may be taller or shorter depending on recommended guidelines based on the season, turf grass type, and/or user preference.

In an embodiment, the blade disk peripheral edge 114 can be positioned as low as possible without intruding below the arc 178 of the average grass stem tip as they return to vertical. The arc 178 can be based at least in part on an the average length of grass stem 164 to housing height 166, cut plane 168 (i.e. grass cut height) and mower ground speed. Minimizing the height of the blade disk peripheral edge 114 helps to reduce the build-up of cut grass stems.

Referring to FIG. 2D, the first and second pairs of blades 134, 136 provide a multiple radius blade tip coverage areas, or multiple cutting ranges, for example cut plane 168 and cut circle plane 170. The multiple radius blade tip coverage areas help to ensure that grass blades that stand up after the first pair of cutting blades 134 have passed over can be impacted by the second pair of cutting blades 136.

The blades 104 extend at an angle 174 of about 5 degrees to 45 degrees relative to the cut plane 168. An optimal blade angle 174, or blade tip pitch, can be determined as a function of the blade 104 tip length, and the height of the blade attachment mechanism 130. In one embodiment, the blades 104 extend at an angle of about 20 degrees relative to horizontal. In another embodiment, the blades 104 project downwardly from the bottom surface of the blade disk at about a 15 degree angle.

The blade angle 174, or blade tip pitch, can work in conjunction with general angle of surface above tip. The blade tip 138 can be approximately parallel with the work surface. This arrangement provides optimum cut effectiveness and resistance to cut grass build up. The distance between blade tip 138 and work surface is a function of the rotational speed of the blade, and the diameter of the cut circle. This allows for grass to raise above the area to be cut bit and minimizes the depth to which non-grass objects (e.g. finger, obstacle) could be inserted thus limiting damage potential.

The height 176 of the blade attachment mechanism 130 can be configured to be above the cut plane 168, and the cut circle plane 170 thereby minimizing any potential for the buildup of clippings on the attachment mechanism 130, and to avoid the catching or snagging of uncut blades on the attachment mechanism 130, and to reduce wear of attachment mechanism features 130.

It should be understood by one having ordinary skill in the art that although portions of the exemplary embodiments of the housing 106 illustrated in the figures include various thicknesses, the thickness of any portion of the housing 106 may be different than those shown, and localized areas of any portion of the housing 106 may have a different thickness than the rest of the portion and/or the other portions.

As shown in FIGS. 3A-3D, in an embodiment the housing 106 includes a substantially open structure having a downwardly directed outer circumference 140. The housing 106 is similar in size and shape, and incrementally larger than, the blade disk 102, such that the blade disk 102 can nest inside, e.g. lie in close proximity to, the housing 106. The outer circumference 140 of the housing 106 lies in close proximity to the blade disk peripheral edge 114. The open structure of the housing 106 encourages the exit and discharge of grass clippings and other debris from the area between the top side 110 of the blade disk 102 and the housing 106 preventing or minimizing the trapping and buildup of grass clippings, dirt and debris on and around the housing 106 and the blade disk 102.

Figure 10A:
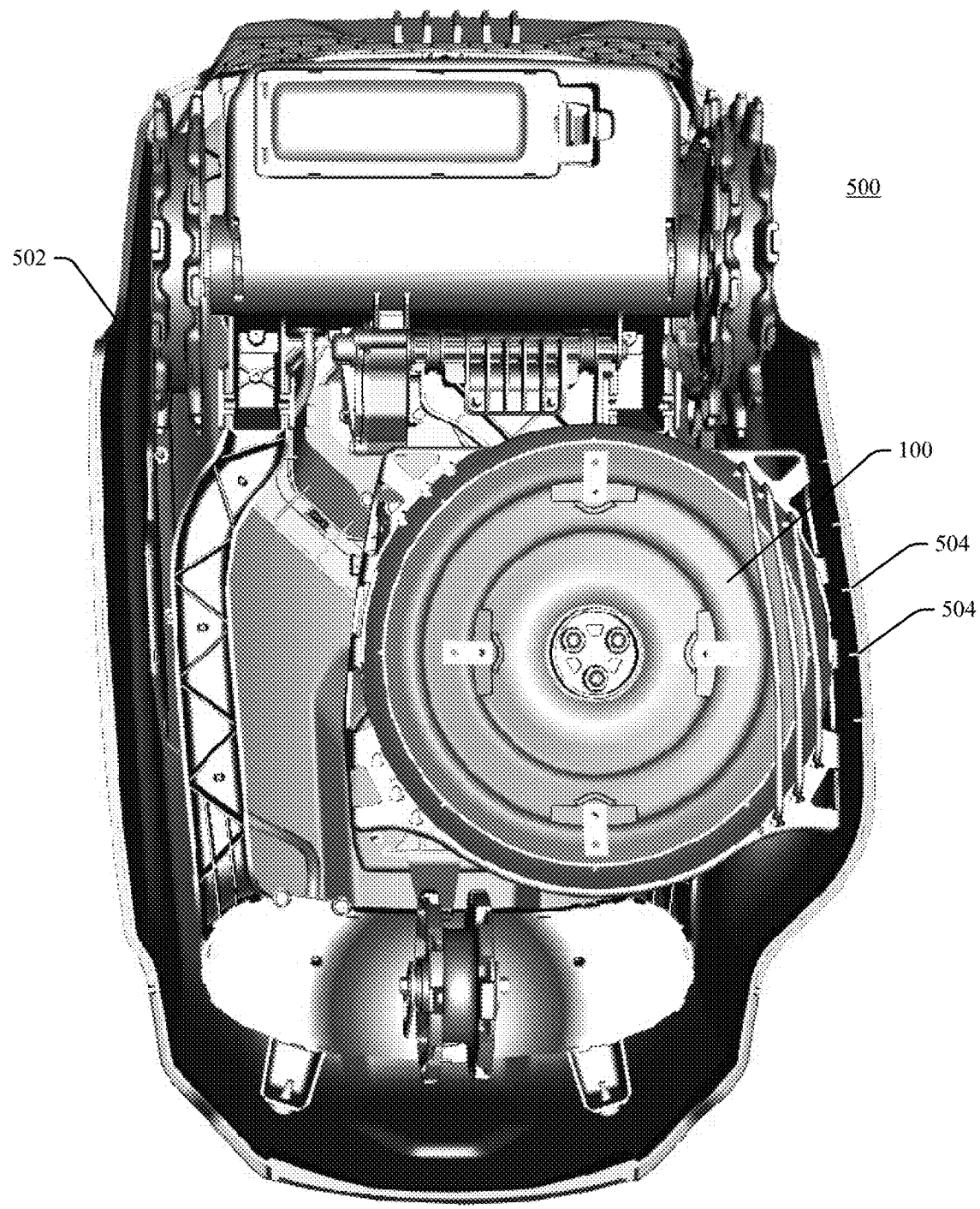
FIGS. 10A and 10B are illustrations of example autonomous mowers including example high-efficiency cutting systems in accordance with an aspect of the disclosure.
Figure 10B:
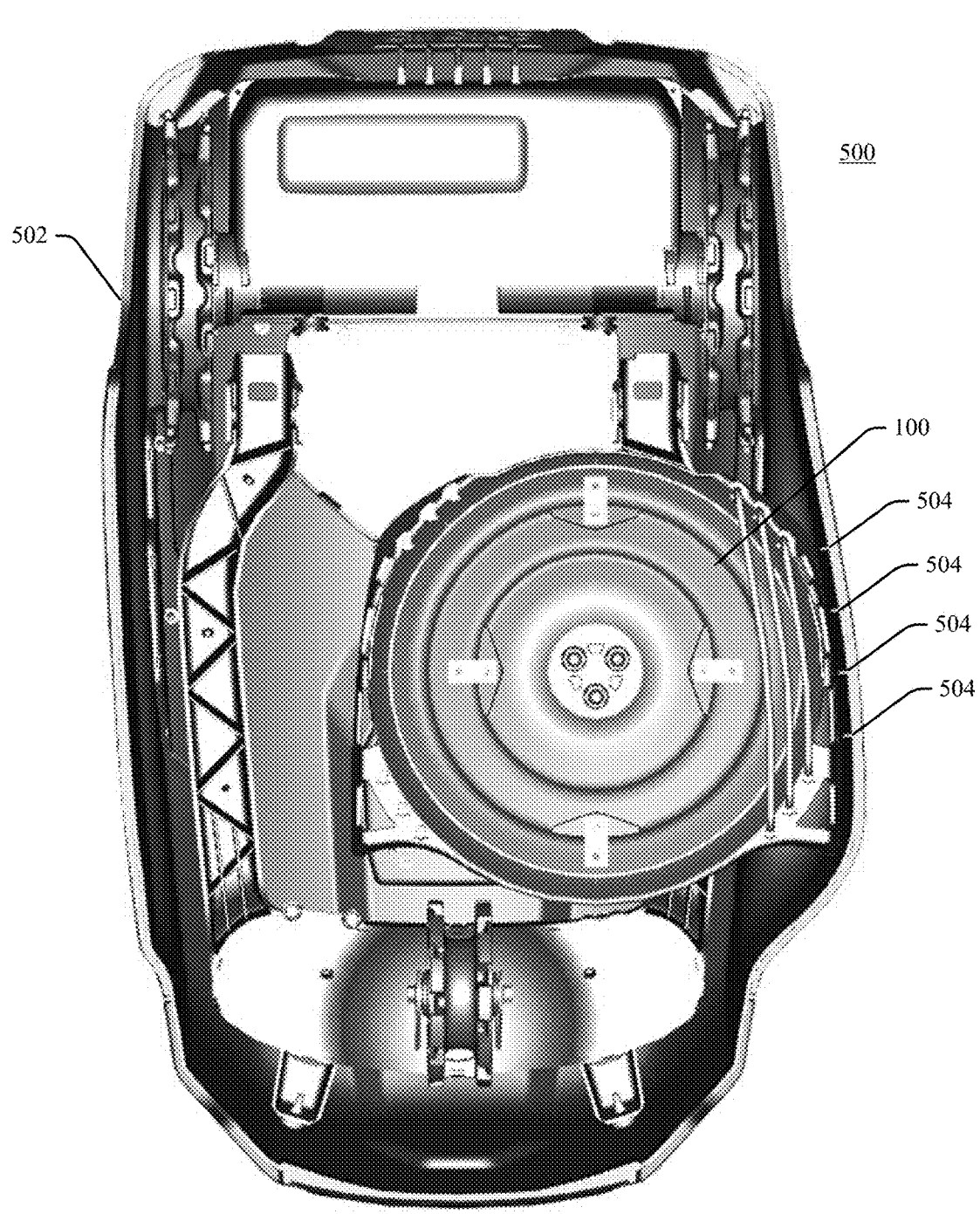

The vertical standoff 152 provides sufficient rigidity to prevent movement or deformation of a surrounding body 502 of an autonomous mower 500 (as shown in FIG. 10B) when external pressure is applied, thereby maintaining a distance between the surrounding body 502, the housing 106 and the cutting blades 104 in compliance with applicable safety standards. A guard 156 can be mounted adjacent to the blade disk 102 and configured to prevent access to the cutting surfaces of the blades 104 while the blade disk 102 is spinning.

It should be understood by one having ordinary skill in the art that although the exemplary embodiments of the blade disk 102 illustrated, for example in the FIGS., demonstrate particular blade locations and blade disk arrangements, other blade locations and arrangements can be used.

Turning to FIGS. 4A, 4C, 4E, and 4G, the blade disk bottom side 112 includes a plurality of concentric, circular raised portions 122 at increasing radii outward from the central portion 108. The raised portions 122 are connected by generally C-shaped curved portions 124. The blade disk bottom surface 112 can include a number of generally C-shaped curved portions 124 that extend vertically above a plane P1 defined by the bottom surface of the central portion 108.

As shown in FIGS. 4B, 4D, 4F and 4H, the blade disk top side 110 includes a plurality of concentric, circular raised portions 122 connected by generally C-shaped curved portions 124 at increasing radii outward from the central portion 108 and corresponding to the raised portions 122, and curved portions 124, of the blade disk bottom surface 112.

The attachment apertures 116 are configured to allow the blade disk 102 to be attached to a rotatable spindle 118 of a battery-powered electric motor 120, which allows rotation of the spindle to be transferred to the blade disk 102.

First and second pairs of cutting blades 134, 136 are mounted to the bottom 112 of the blade disk 102. The first and second pairs of cutting blades 134, 136 extend away from the bottom surface of the blade disk 102 downward at an angle of between about 5 degrees to 45 degrees relative to horizontal. In an embodiment, the blades 104 of the first and second pairs of cutting blades 134, 136 extend downwardly away from the blade disk 112 at substantially the same angle.

In an embodiment, the tip 138 of each blade 104 of the first pair of blades 134 is located inward from the outer peripheral edge 114 of the blade disk 102. In another embodiment, the tip 138 of each blade 104 of the first pair of blades 134 extends outward substantially even with the outer peripheral edge 114 of the blade disk 102. In each case, a second pair of blades 136 is located inward closer to the blade disk central portion 108 than the first pair of blades 134.

The arrangement of the blades 104, that is, a second pair of blades 136 mounted radially inward of a first pair of blades 134, and the configuration of the blade disk 102, has been shown to provide an unexpected and beneficial improvement over conventional cutting systems due at least in part to the multiple radius blade tip coverage area and angled blade mount. The disclosed arrangement of the blade disk 102 and the blades 104 yields a first pass grass cutting performance on par with mowers generally having much larger power requirements.

As the blade disk 102 rotates, air is moved radially outward across the blade disk 102. The displaced air causes an upward moving air flow. The upward moving air flow combined with vibrations caused by the blades 104 impacting the grass stems during the mowing operation, help to lift the blades of grass upwardly to be cut.

Grass blades that have been pushed downward by the mower wheels, or a leading edge of the mower body 502, tend to stand up or spring back at different points during the mowing operation. The first and second pairs of blades 134, 136 provide a multiple radius blade tip coverage area, or multiple cutting ranges, that help to ensure that grass blades that stand up after the first pair of cutting blades 134 have passed over can be impacted by the second pair of cutting blades 136.

The multiple radius blade tip coverage area produces a wider effective cutting zone, and more complete cut, when compared to traditional autonomous mowers that utilize individual swinging blade tips at a single radius. Further, the disclosed cutting system has also been shown to provide a reduced edge trimming distance when compared to conventional autonomous mowers.

The presently disclosed high-efficiency cutting system provides a superior and reduced edge trimming distance due at least in part to the function of the guards 156, vertical standoff 152, and/or standoffs 504. Traditional autofocus mowers generally include a blade placement at the center of the mower, and located away from the edges of the mower for safety reasons, for example, to prevent injury to a hand, finger, foot, or damage to an obstacle. In contrast, the presently disclosed high-efficiency cutting system includes synergistic safety features that provide greater safety and a reduced edge trimming distance.

The effect of the spinning blade disk 102 on the grass blades is enhanced by the size, shape, position and configuration of the blade disk 102, and in particular the configuration of the blade disk bottom surface 112, e.g. raised portions 122, curved portions 124, together with the size, shape, placement and orientation of the blades 104, which all contribute to the efficiency of the cutting system.

The configuration of the blade disk 102, for example raised portions 122 and curved portions 124, has been found to be effective in minimizing contact with the grass thereby reducing drag forces on the bottom surface of the blade disk 112.

The configuration of the blade disk 102, for example raised portions 122 and curved portions 124, along with the arrangement of the blades 104 has also been found to be effective for directing the already cut grass stems out past the peripheral edge 114, thereby reducing drag forces by preventing or minimizing the build-up of cut grass on and around the blades 104, and on the bottom surface of the blade disk 112.

Figure 4C:
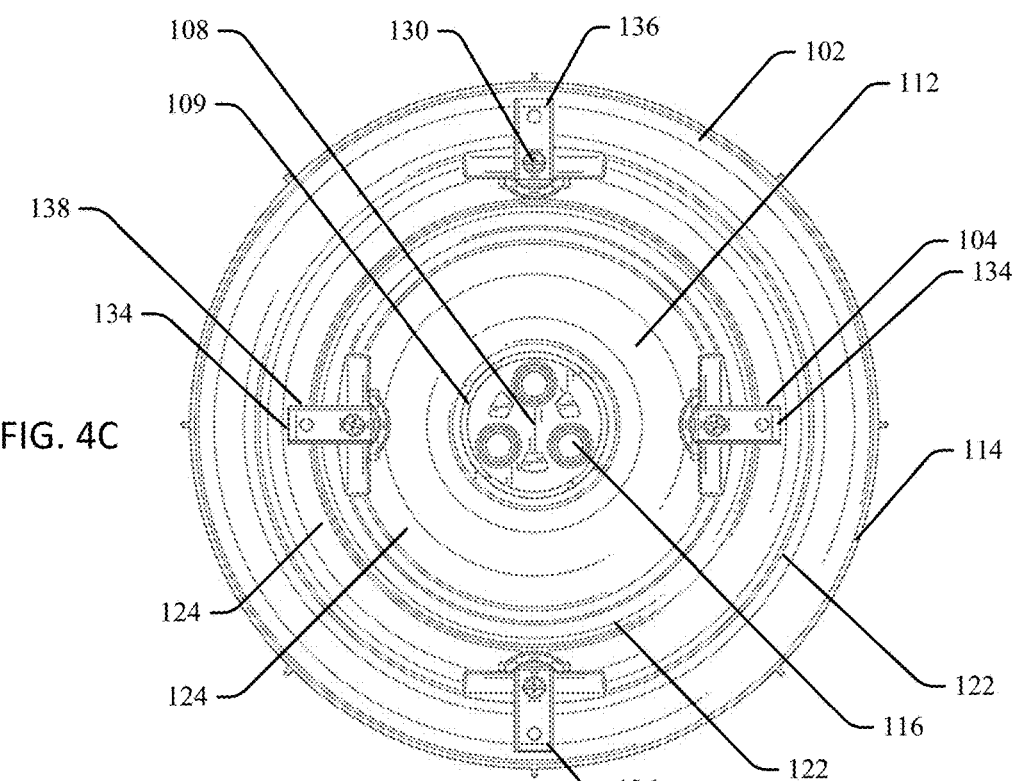
Figure 4D:
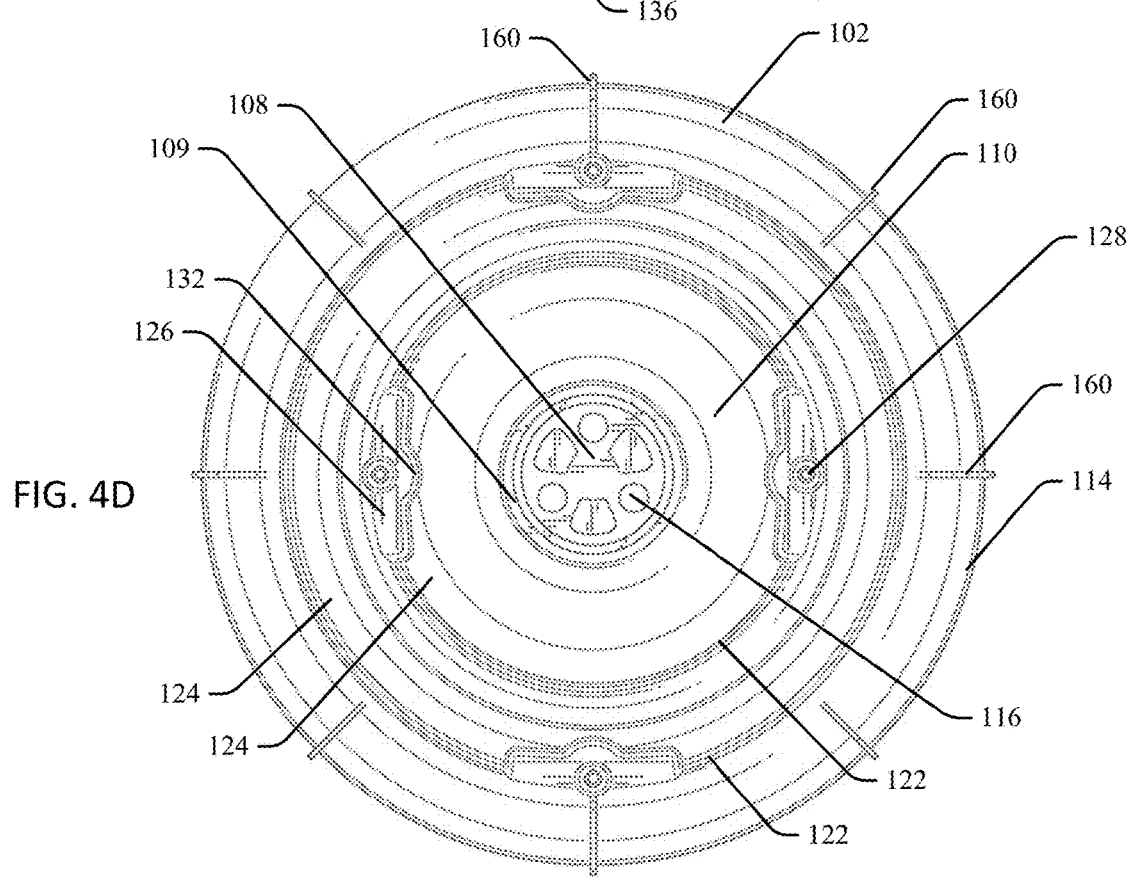
Figure 4E:
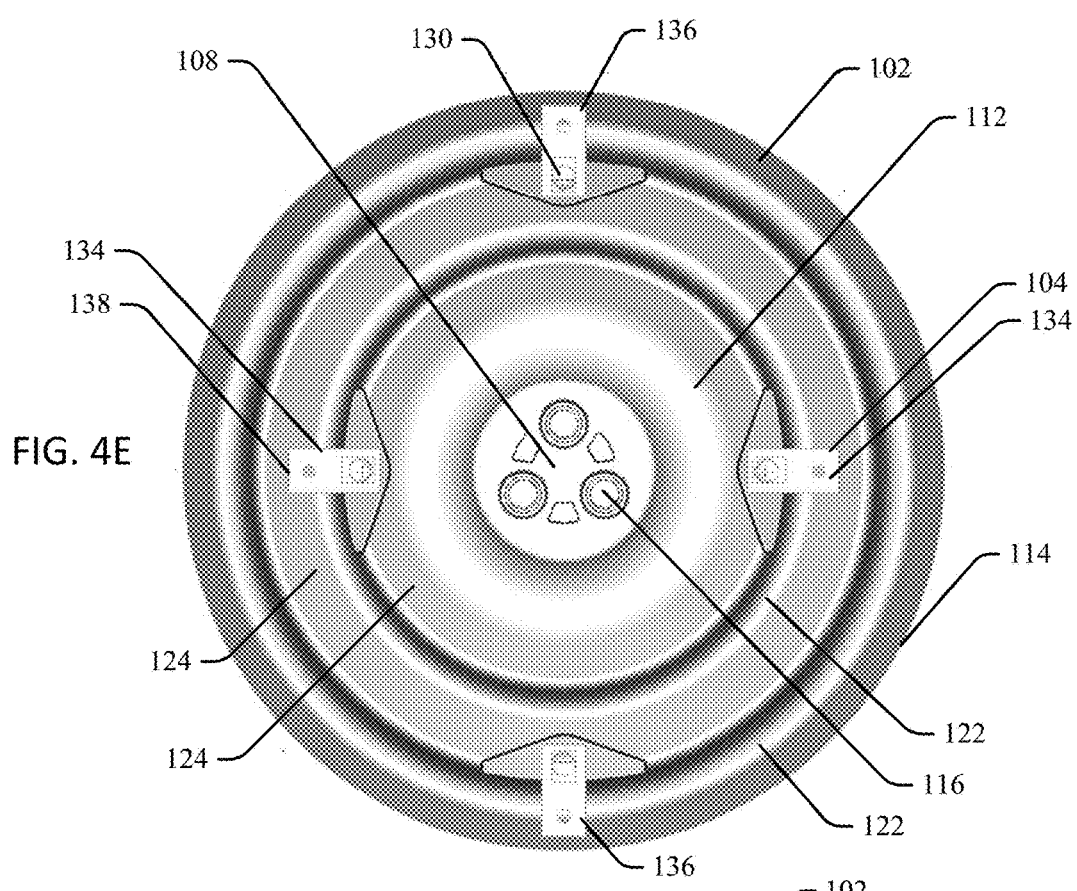
Figure 4F:
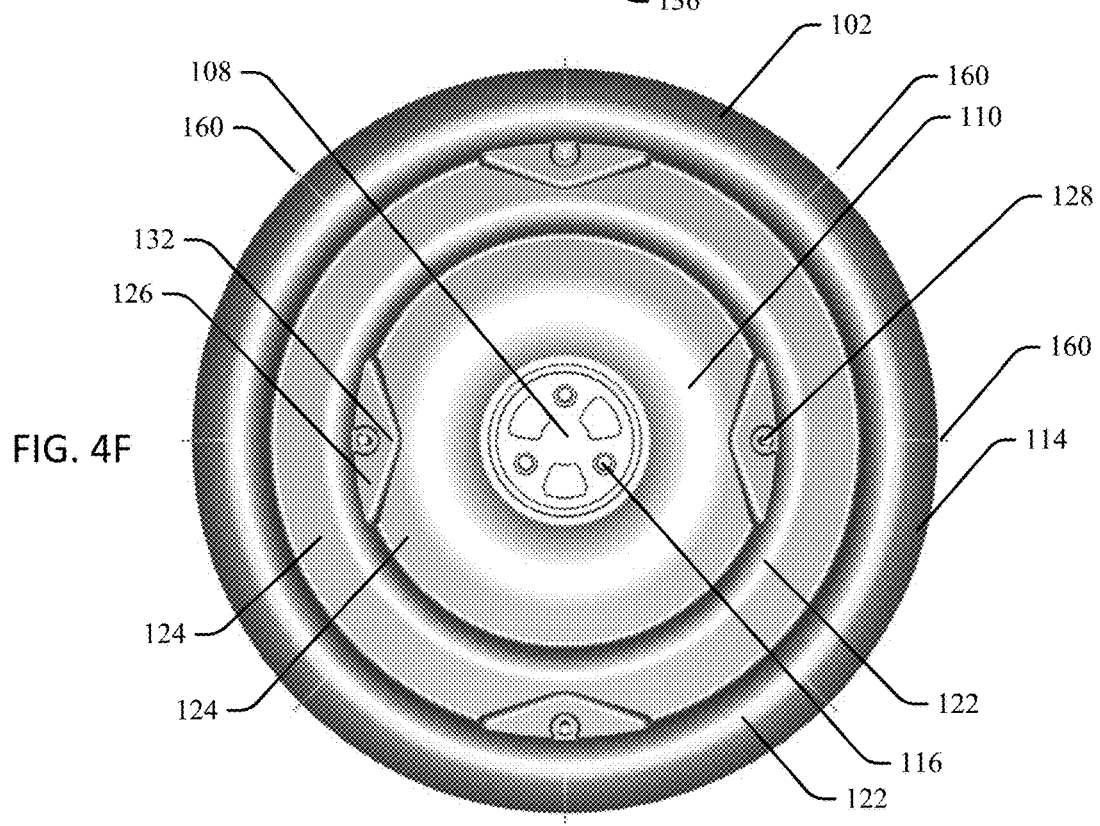
Figure 4G:
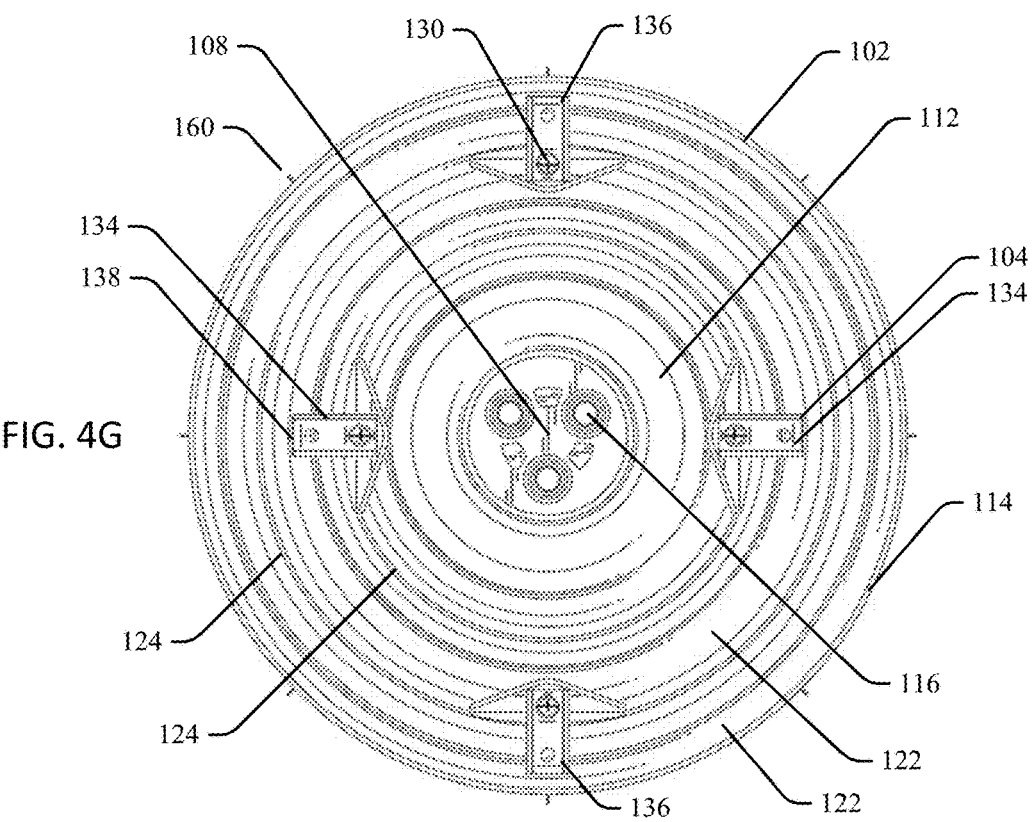
Figure 4H:
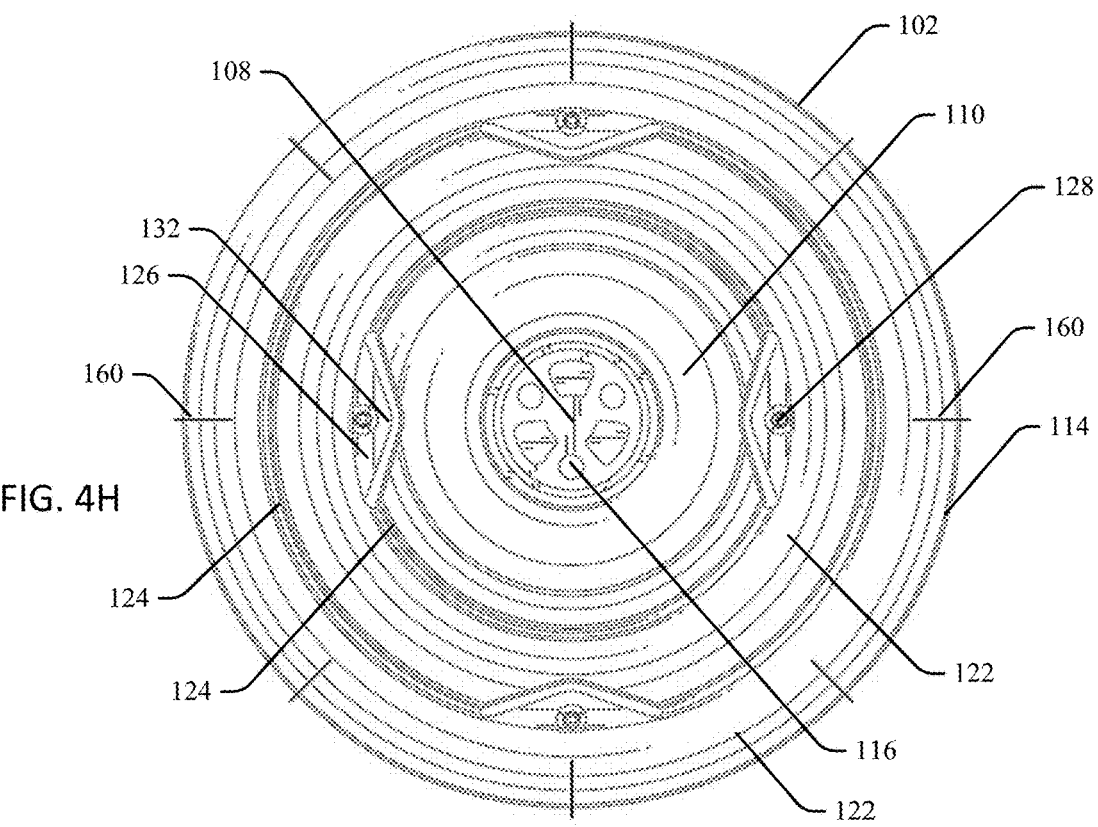
Figure 4I:
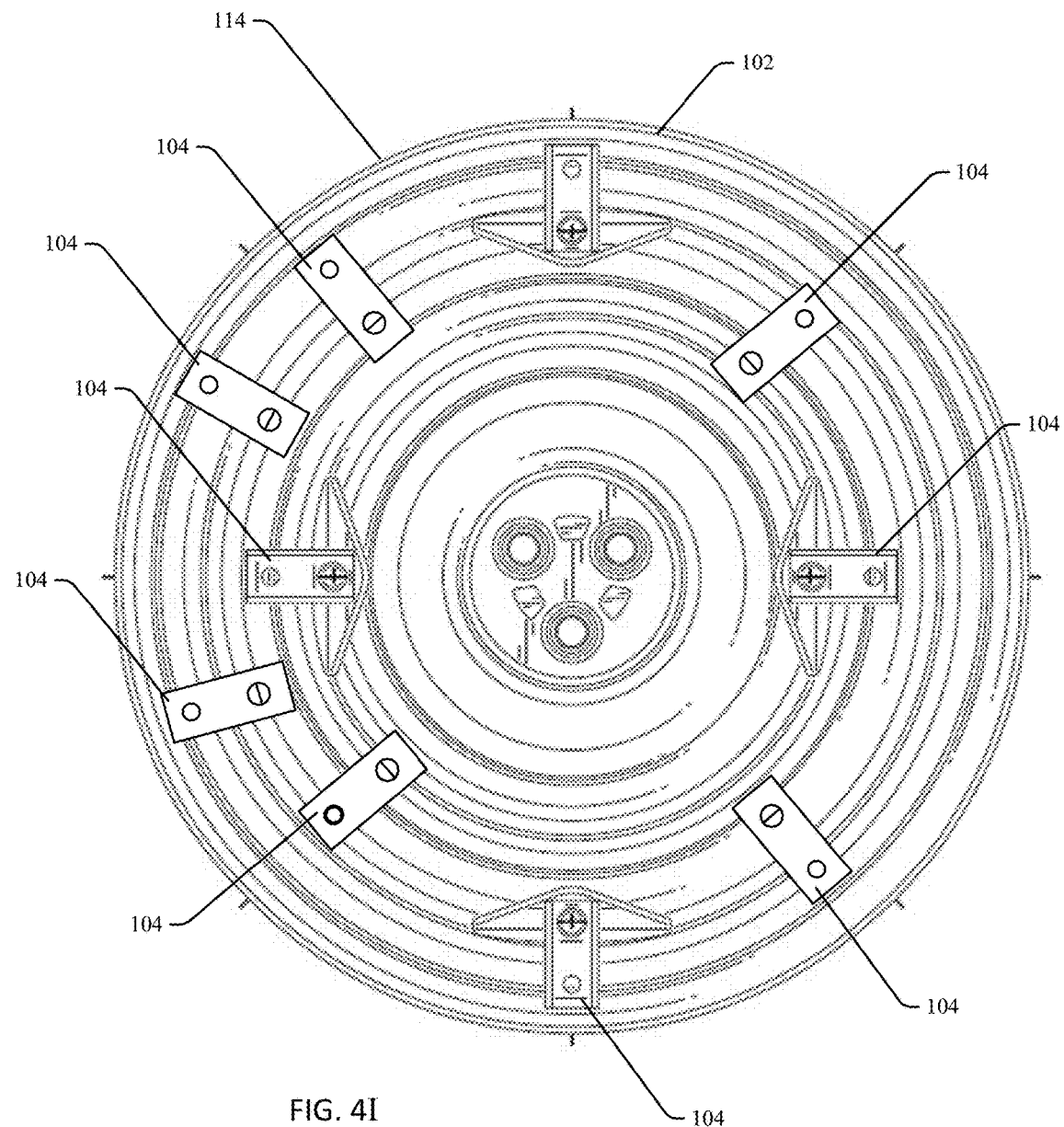

Referring to FIG. 4I, in an embodiment a plurality of groups of cutting blades 104 are mounted to the bottom 112 of the blade disk 102. Two or more groups of radially offset cutting blades 104 can be secured to the bottom side of the blade disk, each of the groups of radially offset blades arranged angularly about the blade disk central portion 108. In an embodiment, a plurality of radially offset cutting blades are secured to the bottom side of the blade disk and are arranged angularly about the blade disk central portion Referring to FIGS. 4B, 4D, 4F and 4H, in an embodiment, the top side 110 of the blade disk 102 is provided with a plurality of projections 160, for example, vanes, fins, ribs, or other projections that extend along the top side 110 of the blade disk and extend into the space between the top side 110 of the blade disk 102 and the housing 106. In one embodiment, the projections 160 extend into the opening 144 between the peripheral edge 114 of the blade disk 102 and the outer circumference 140 of the housing 106. The projections 160 can include integrally molded fins or thin, curved projections that extend radially along an outer raised portion 122 of the top side 110 of the blade disk 102. In further embodiments, the projections 160 extend radially along the top of the blade disk 102 from the central portion 108 to the peripheral edge 114.

In an embodiment, the housing 106 can include a protected air inlet (not shown), for example, a snorkel-type or filtered opening, which allows air to enter without carrying any debris or dirt. During operation, the projections 160 encourage air flow in through the protected air inlet producing an air curtain which moves air from the central portion 108 of the blade disk 102 outward and down along the periphery of the top side 110 of the blade disk 102, and encouraging the exit and discharge of grass clippings and other debris from the area between the top side 110 of the blade disk 102 and the open lower portion 142 of the housing 106.

In other embodiments, the projections 160 can include flexible filaments, fibers or thread-like structures in addition to, or instead of fins. The projections 160 serve to prevent or minimize the intrusion of grass clippings, dirt and debris there between, while not interfering with the rotation of the blade disk 102. The projections 160 can also provide a cleaning function by dislodging or disrupting any build-up of grass clippings, dirt or debris that may be present between the blade disk 102 and the housing 106.

Figure 4J:
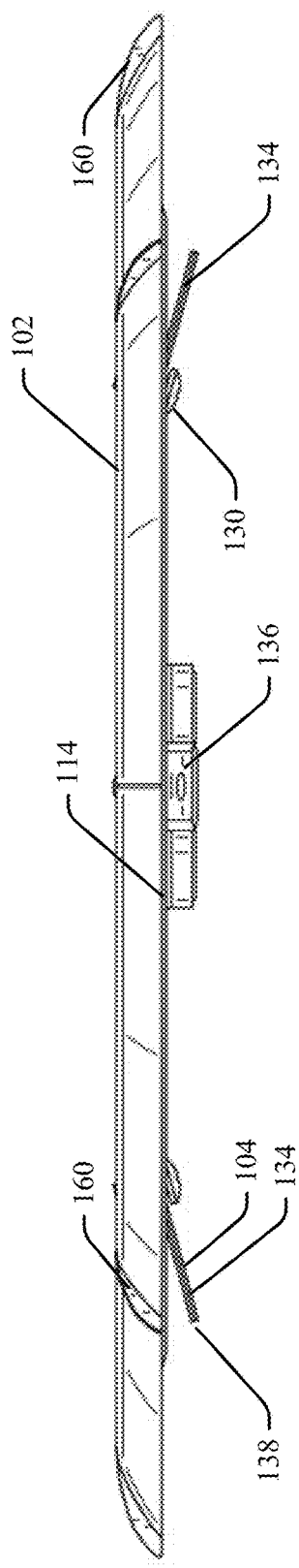
Figure 4K:
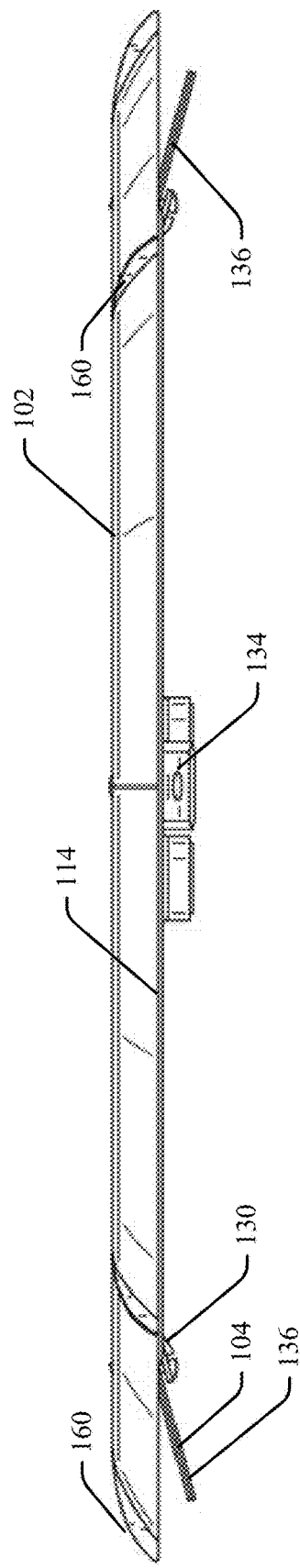

Referring to FIGS. 4J and 4K, the first and second pairs of cutting blades 134, 136 are held in position at a downward angle relative to horizontal. The downward angle of the blades 104 contributes to the efficiency of the blade disk 102 during mowing, and reduces the rotational loading, or drag, caused by uncut grass blades brushing against the spinning blade disk 102 and blades 104. The pitched blade tips 138 also help minimize clogging and clumping of cut grass blades on the blades 104, on the blade disk 102, and the housing 106. The downward angle of the blades 104 has also been shown to be effective in reducing grass and debris build-up on and around the pivoting area of the blade attachment 130.

In an embodiment, the blades 104 extend at an angle of about 5 degrees to 45 degrees relative to horizontal. In one embodiment, the blades 104 extend at an angle of about 20 degrees relative to horizontal. In another embodiment, the blades 104 project downwardly from the bottom surface of the blade disk at about a 15 degree angle.

As shown in FIGS. 5A-5D, a front facing side 148 of the housing 106 is provided with integrally molded arched portions 150 at opposing ends of the housing 106 for guiding the grass blades forward as the autonomous mower 500 advances across the lawn. The outer edges of conventional autonomous mowers tend to push the uncut grass blades aside as the mower moves along. Grass blades that have been pushed aside do not come into contact with the cutting blades, thus the effective cutting width of the autonomous mower is correspondingly narrowed.

The arched portions 150 of the housing 106 guide the grass blades in a forward direction, rather than to each side, so that the grass blades come into contact with the cutting blades 104, and ensure that the advantages of a full effective cutting width are provided by the blades 104.

Figure 5A:
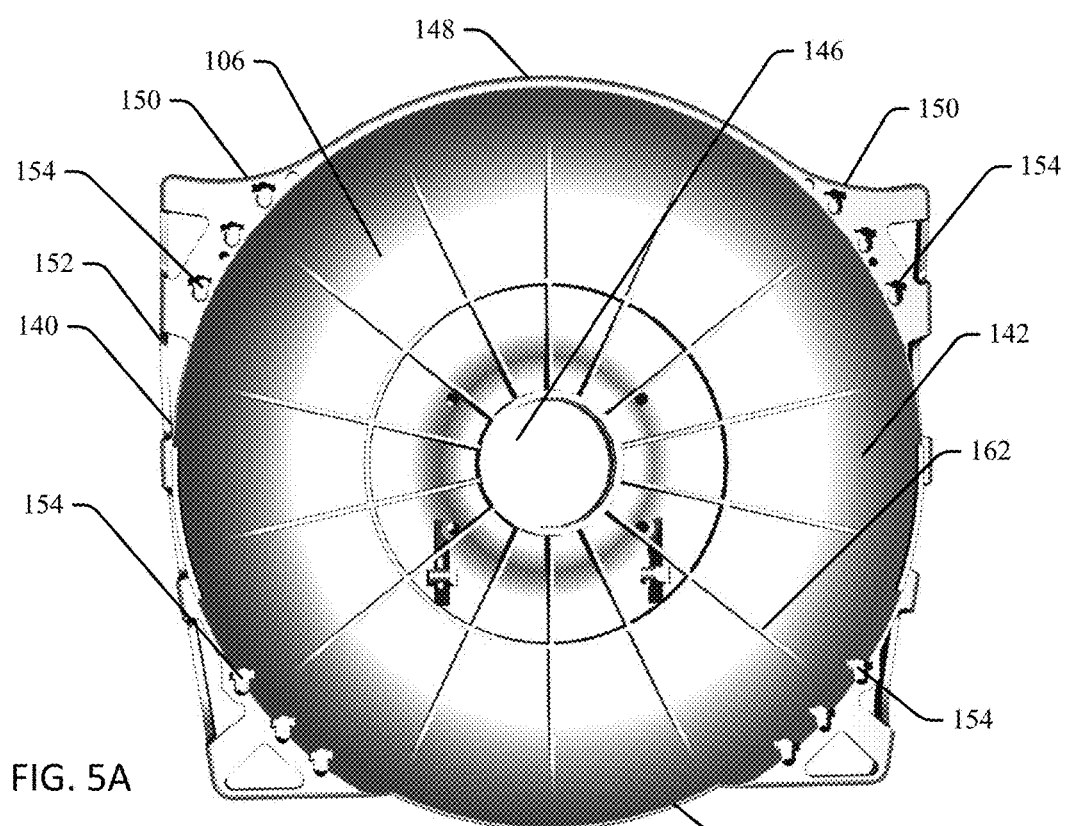
FIGS. 5A, 5B, 5C, and 5D are illustrations of example housings for high-efficiency cutting systems for an autonomous mower in accordance with an aspect of the disclosure.
Figure 5B:
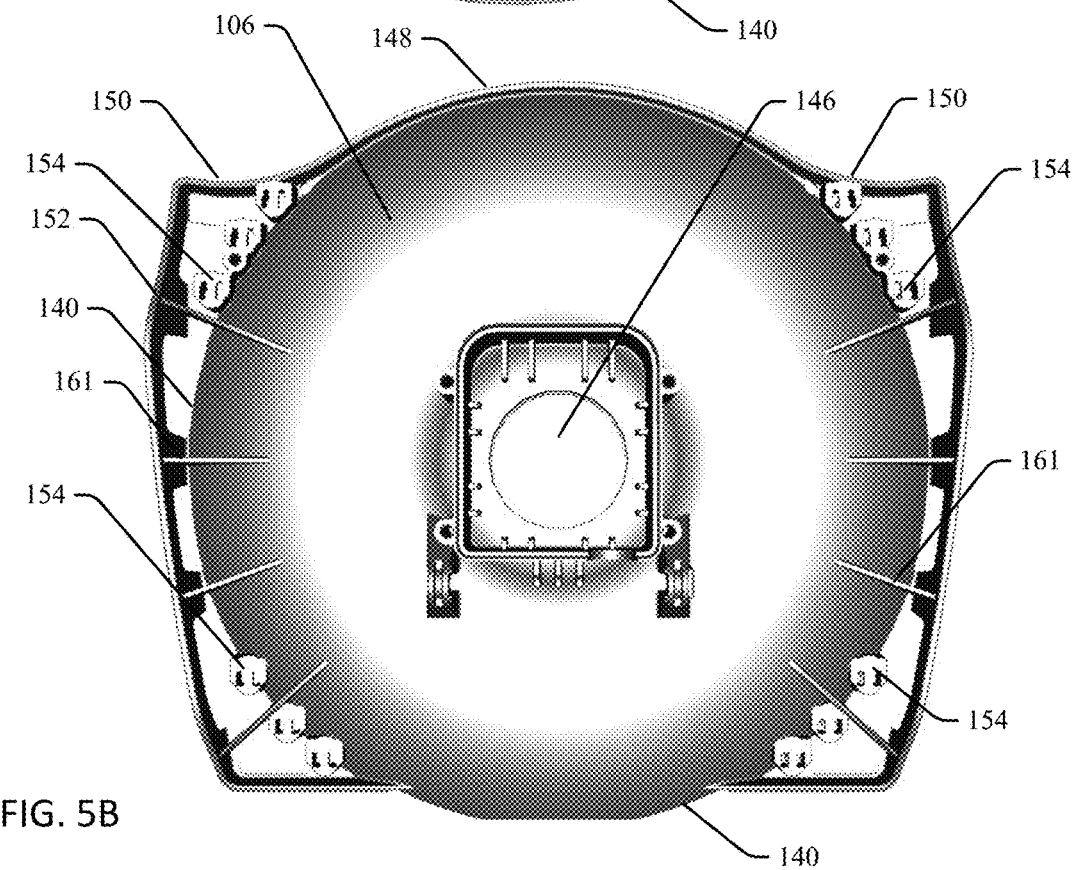
Figure 5C:
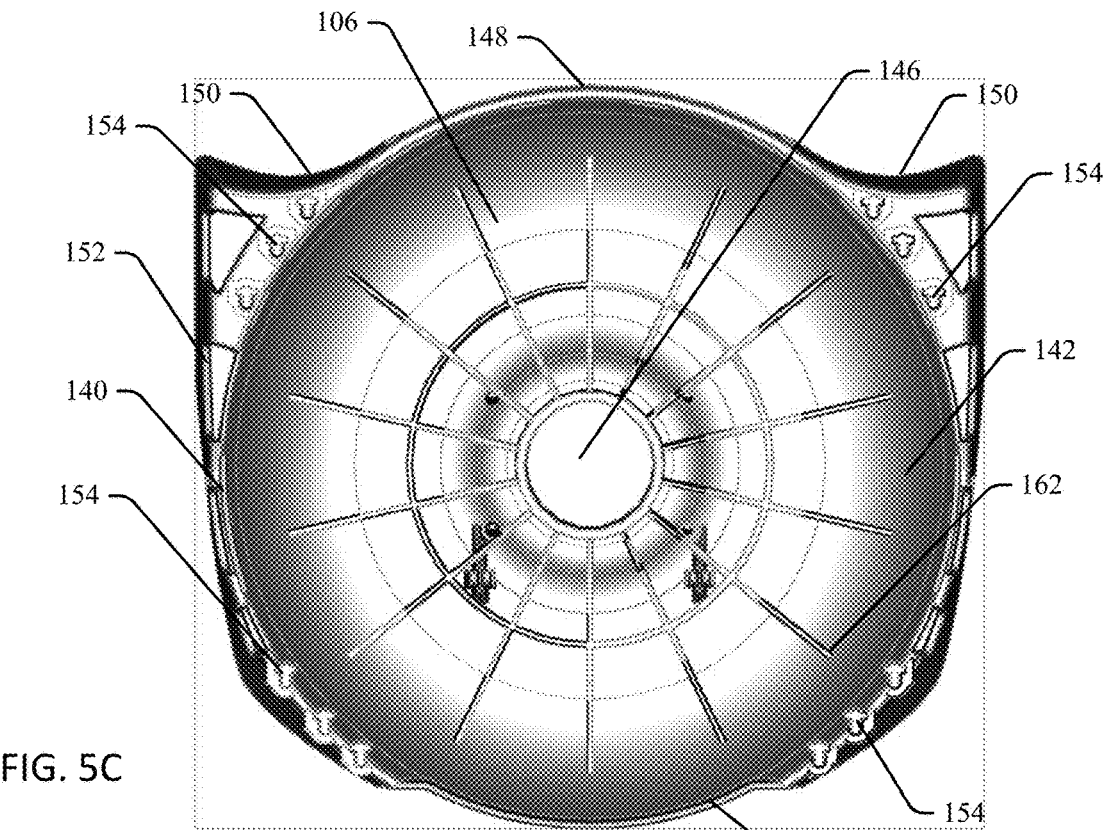

In the embodiments illustrated in FIGS. 5A and 5C, the top surface of the housing 106 is provided with a plurality of projections 161, for example, vanes, fins, ribs, or other projections that extend along the top side of the housing 106. The projections 161 extending along the top side of the housing 106 can increase the structural strength of the housing 106 and provide additional support for the vertical standoff 152.

Figure 5D:
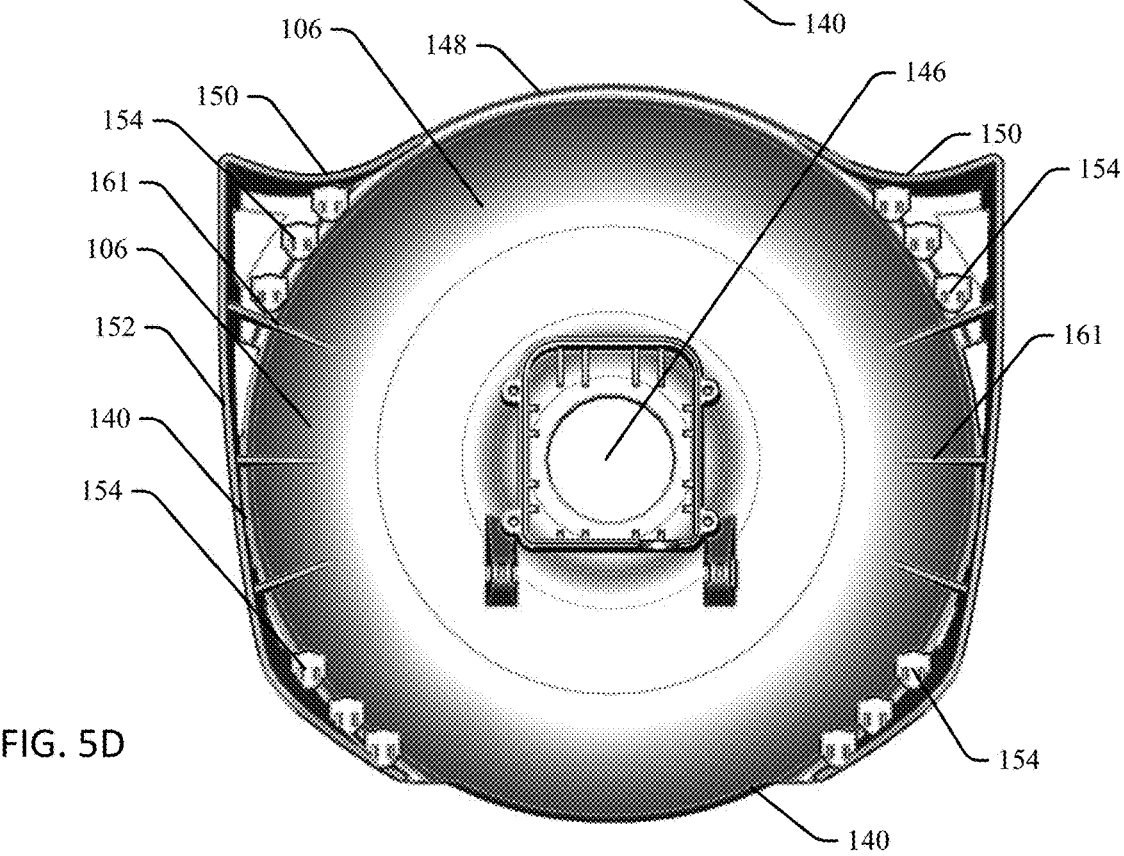

In the embodiments illustrated in FIGS. 5B and 5D, the bottom surface of the housing 106 is provided with a plurality of projections 162, for example, vanes, fins, ribs, or other projections that extend along the bottom side of the housing 106 and into the opening between the housing 106 and the blade disk 102 of the high-efficiency cutting system 100. The projections 162 can include a plurality of vanes, fins, ribs, or other thin, curved projections that extend radially along the bottom of the housing 106, for example, from the aperture 146 towards the outer circumference 140 of the housing 106. In a further embodiment, the projections extend into the opening between the outer circumference 140 of the housing 106 and the peripheral edge 114 of the blade disk 102.

The projections 162 extending along the bottom side of the housing 106 increase the structural strength of the housing 106. In further embodiments, the projections 162 can include flexible filaments, fibers, brushes, or thread-like structures in addition to, or instead of, fins. The projections can extend into the opening 144 between the peripheral edge 114 of the blade disk 102 and the outer circumference 140 of the housing 106. The projections 162 can serve to prevent or minimize the intrusion of grass clippings, dirt and debris there between, while not interfering with the rotation of the blade disk 102.

Figure 6A:
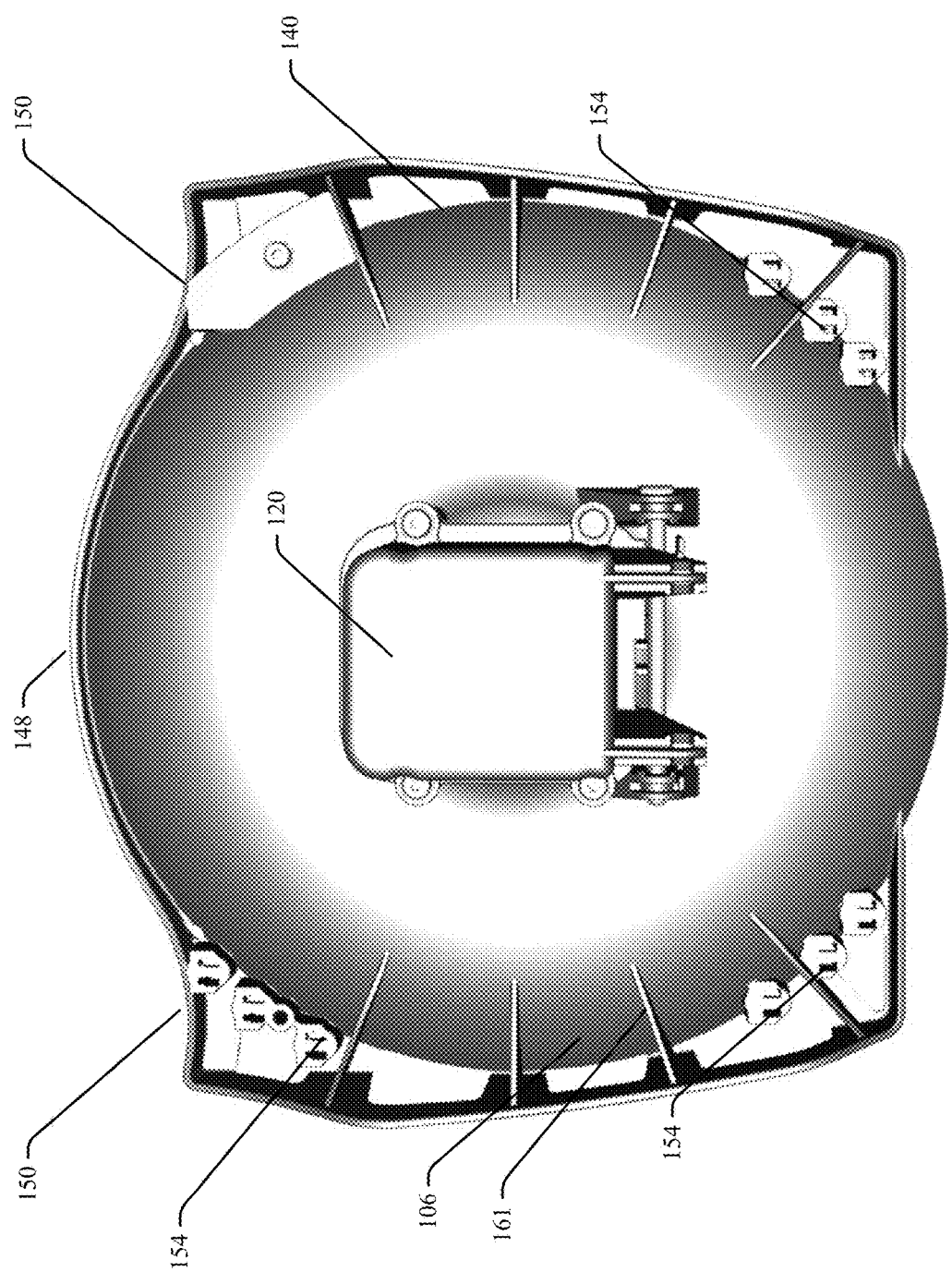
FIGS. 6A, 6B, and 6C are illustrations of example housings for a high-efficiency cutting system in accordance with an aspect of the disclosure.
Figure 6B:
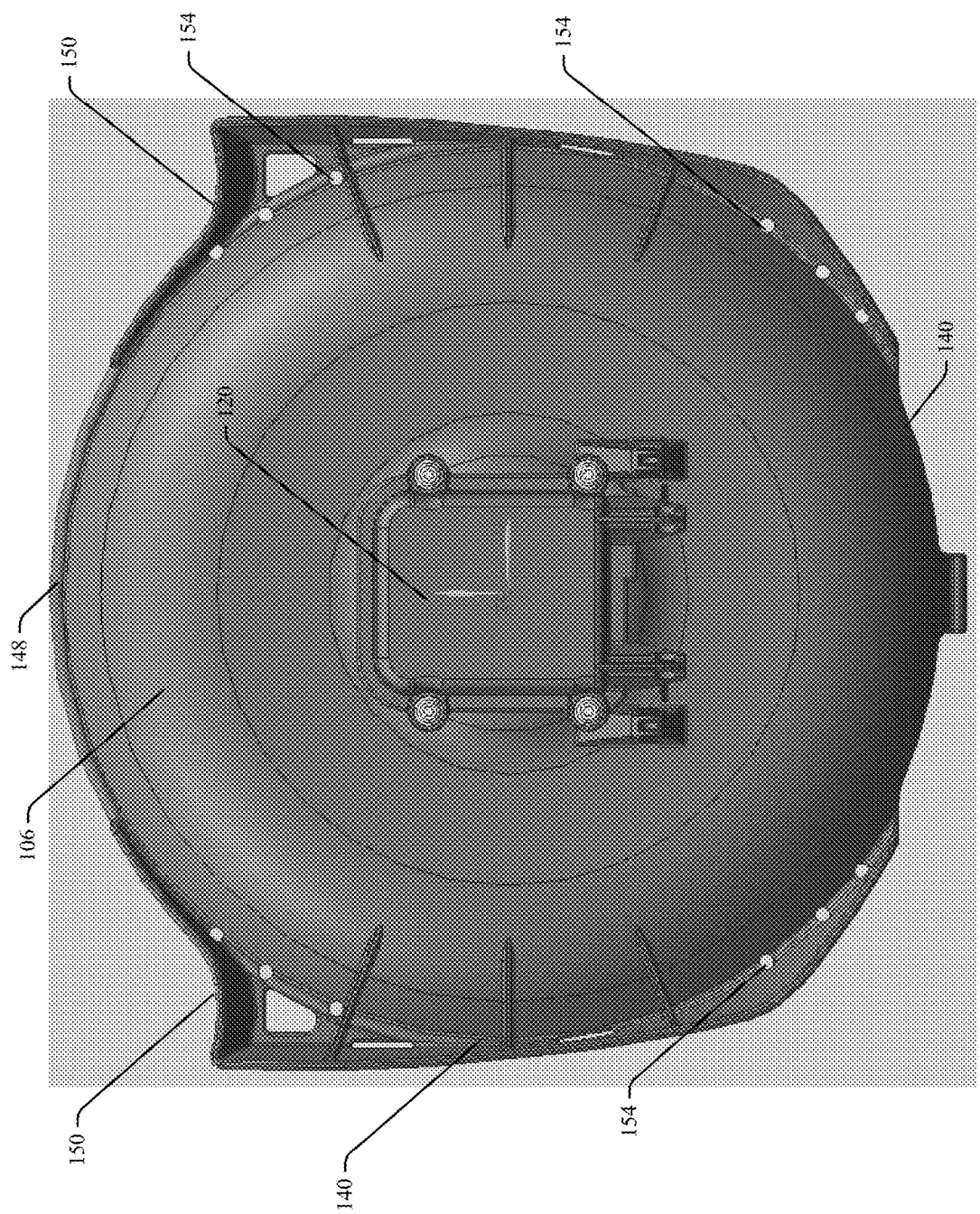
Figure 6C:
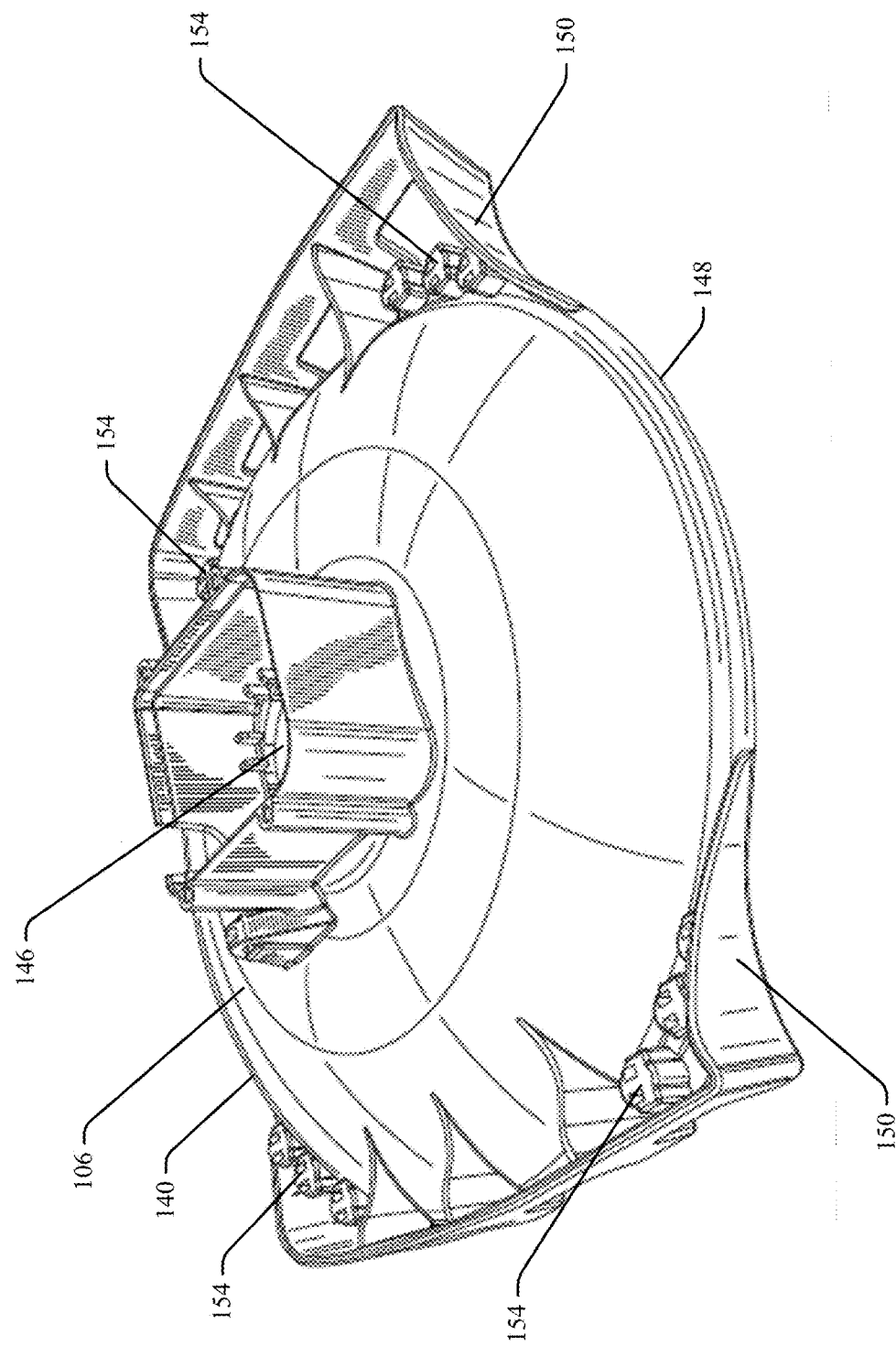

FIGS. 6A and 6B are top views of example housings 106. FIG. 6C is a top perspective view of the generally bowl-shaped housing 106. The housing 106 includes a downwardly directed outer circumference 140. A front facing side 148 of the housing 106 is provided with integrally molded arched portions 150 at opposing ends of the housing 106 for guiding the grass blades forward as the autonomous mower 500 advances across the lawn.

The housing 106 can include a number of apertures 154 for mounting a guard 156. For example, a guard 156 can be mounted adjacent to the blade disk 102 and configured to prevent access to the cutting surfaces of the blades 104 while the blade disk 102 is spinning. The housing 106 includes a centrally located aperture 146 that lines up with attachment apertures 116 on the blade disk 102.

Figure 7A:
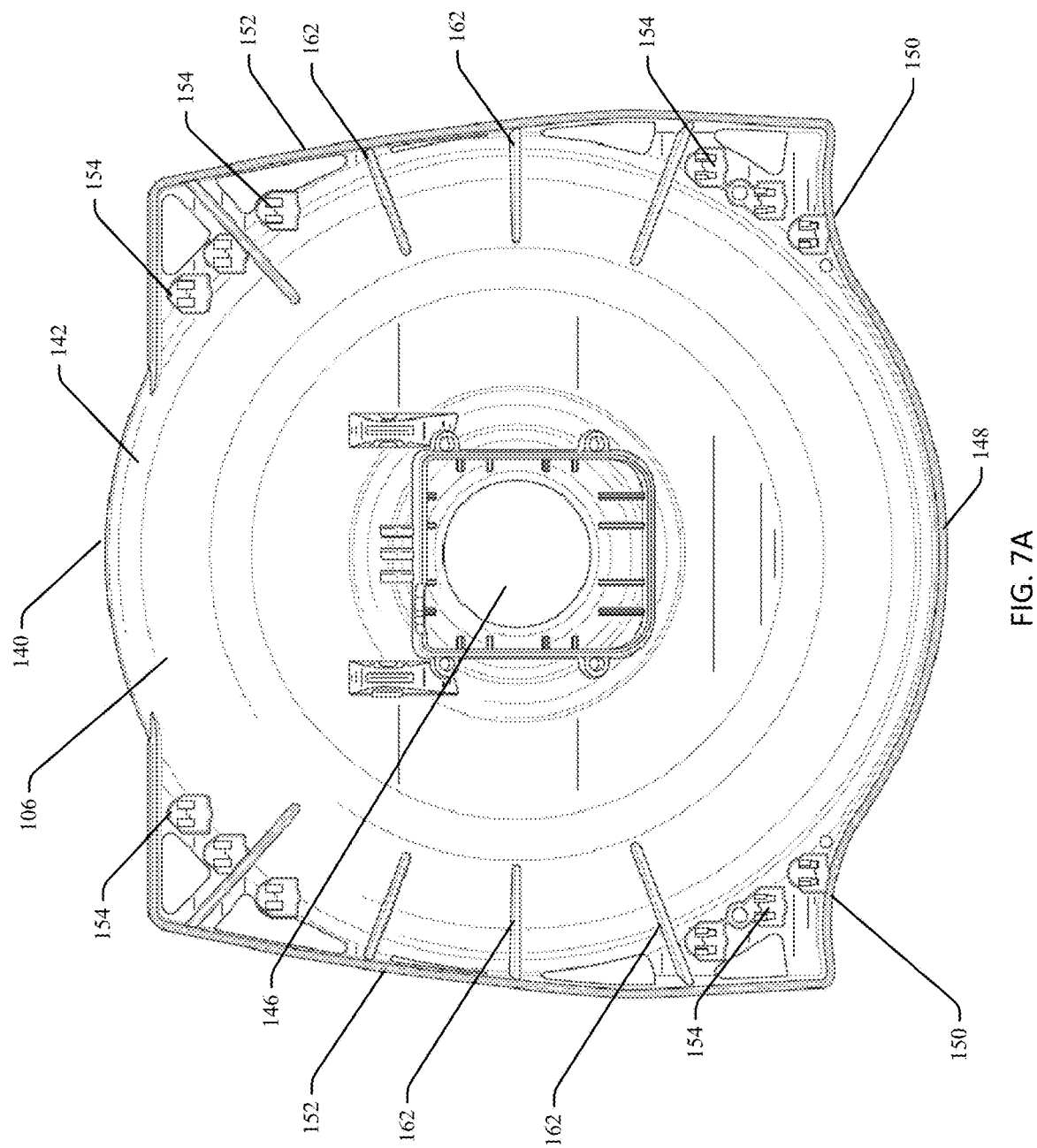
FIGS. 7A, 7B, 7C, and 7D are illustrations of example housings for a high-efficiency cutting system in accordance with an aspect of the disclosure.
Figure 7B:
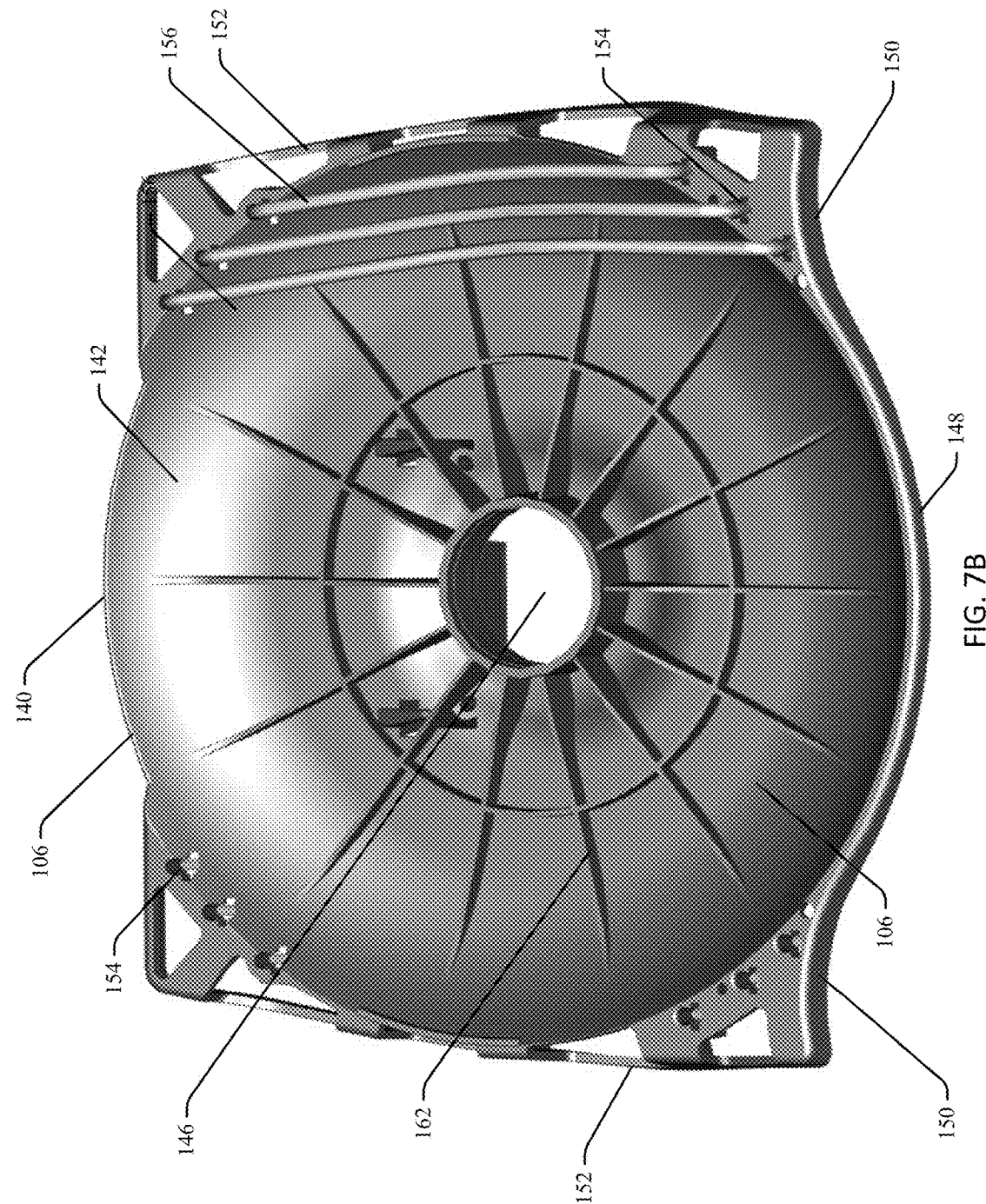
Figure 7C:
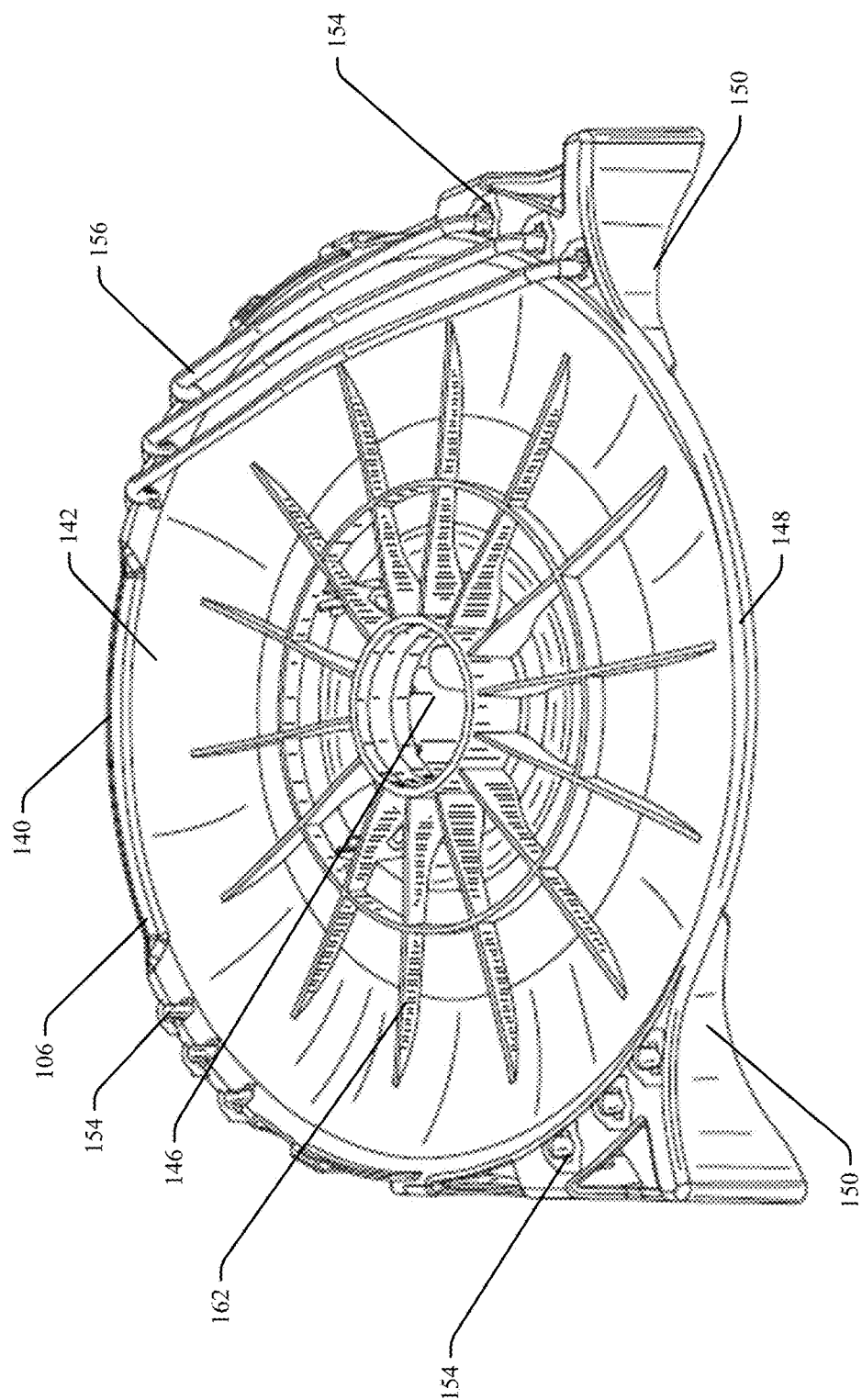
Figure 7D:
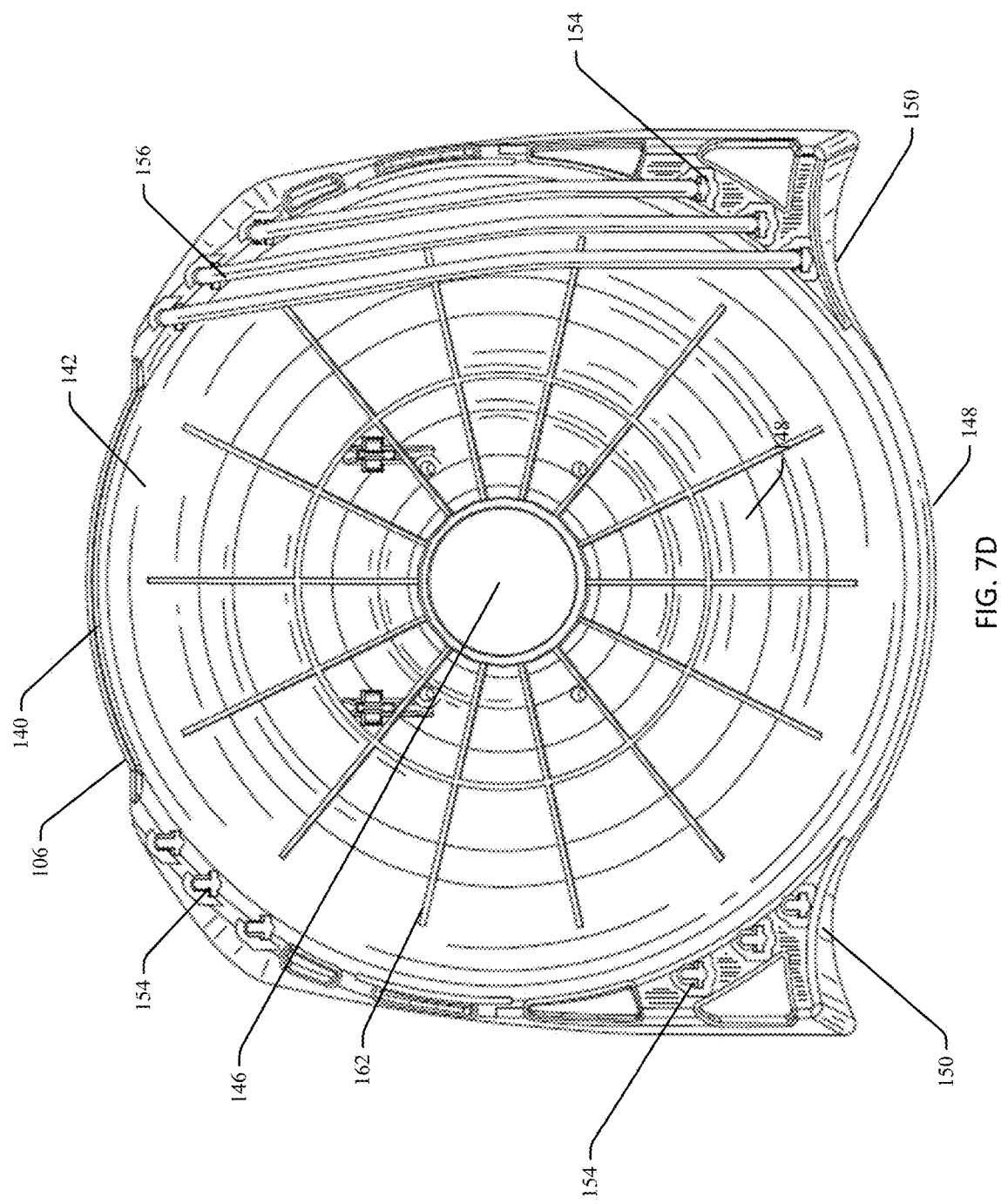

FIGS. 7A and 7C are bottom perspective views of the generally bowl-shaped housing 106. FIGS. 7B and 7D are bottom views of the housing 106. The housing 106 includes a downwardly directed outer circumference 140, and an open lower portion 142. The open lower portion 142 of the housing 106 is similar in size and shape, and incrementally larger than, the blade disk 102, such that the blade disk 102 can nest inside the housing 106.

Still referring to FIGS. 7A-7D, the front facing side 148 of the housing 106 is provided with integrally molded arched portions 150 at opposing ends of the housing 106 for guiding the grass blades forward as the autonomous mower 500 advances across the lawn. The arched portions 150 of the housing 106 guide the grass blades in a forward direction, rather than to each side, so that the grass blades come into contact with the cutting blades 104, and ensure that the advantages of a full effective cutting width are provided by the blades 104.

The housing 106 includes a centrally located aperture 146 that lines up with attachment apertures 116 on the blade disk 102. The spindle 118 of the motor 120 extends through the housing aperture 146 and is attached to the blade disk 102. In operation, the housing 106 remains stationary as the blade disk 102, driven by the spindle 118 of the motor 120, rotates. The bottom surface of the open lower portion 142 of the housing 106 is provided with a plurality of projections 162, for example, vanes, fins, ribs, or other projections.

The housing 106 can include a number of apertures 154 for mounting one or more guards 156. For example, a guard 156 can be mounted to the housing 106 utilizing the apertures 154 adjacent to the blade disk 102 and configured to prevent access to the cutting surfaces of the blades 104 while the blade disk 102 is spinning.

The guard 156 includes parallel spaced longitudinal bars or rigid wires that prevent intrusion of a digit, e.g. finger, thumb, toe, extremity, into the radius of the cutting blades 104 in compliance with applicable safety regulations for robotic lawn mowers. The guard 156 allows the uncut grass blades to contact the cutting blades 104 while minimizing clogging due to buildup of grass clippings.

Figure 8A:
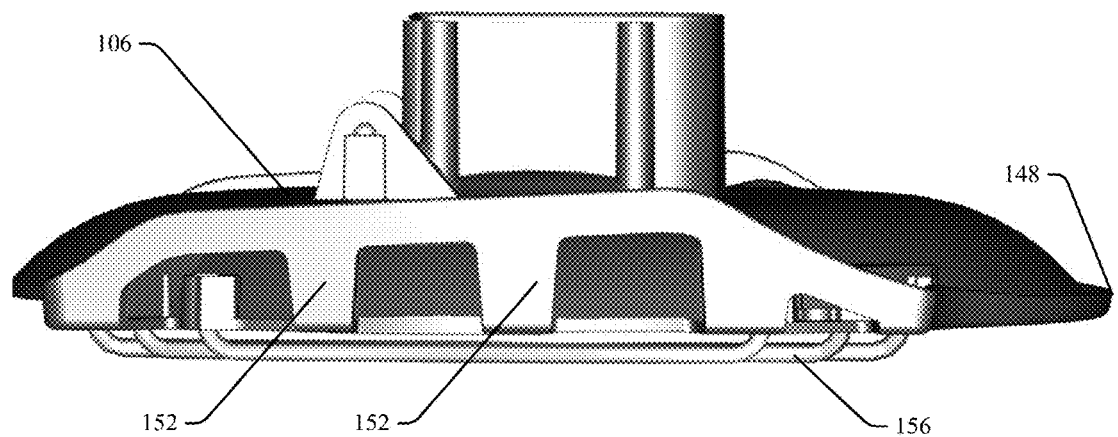
FIGS. 8A, 8B, 8C, and 8D are illustrations of example housings for a high-efficiency cutting systems for an autonomous mower in accordance with an aspect of the disclosure.
Figure 8B:
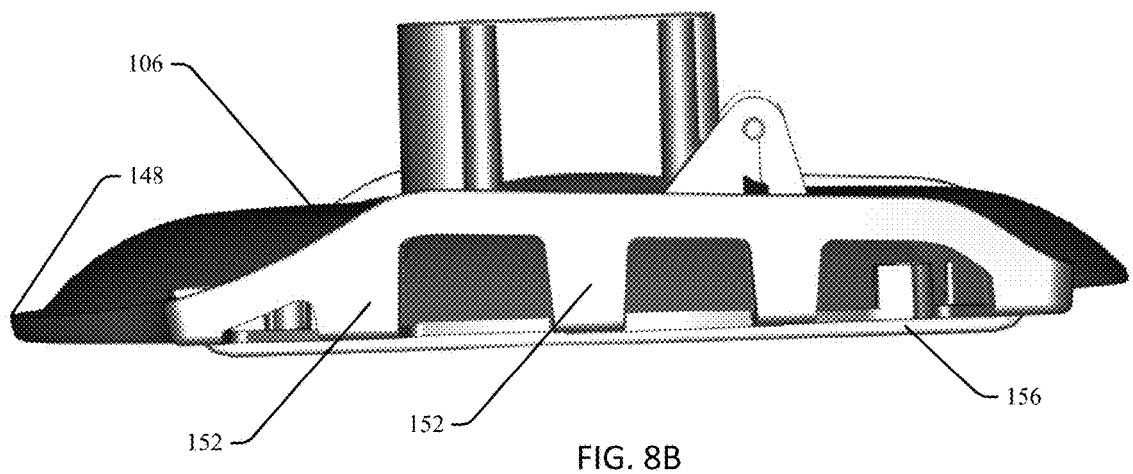
Figure 8C:
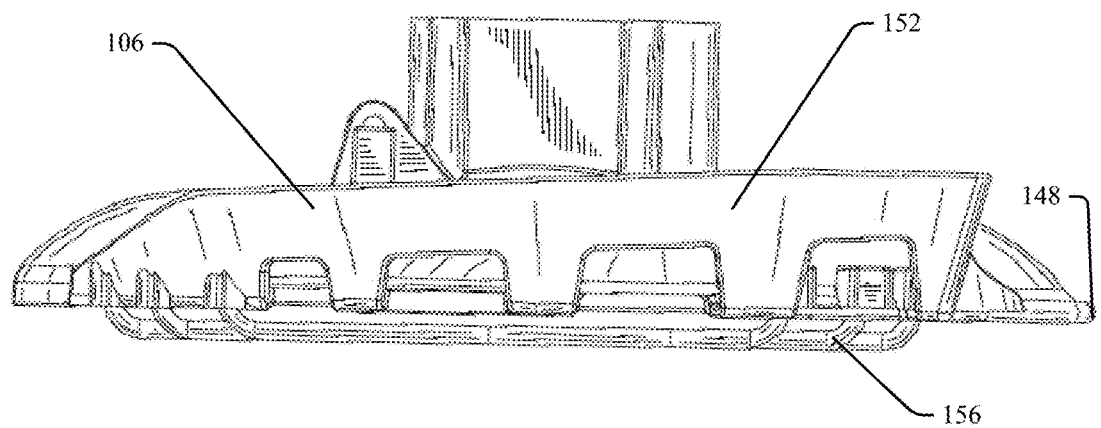
Figure 8D:
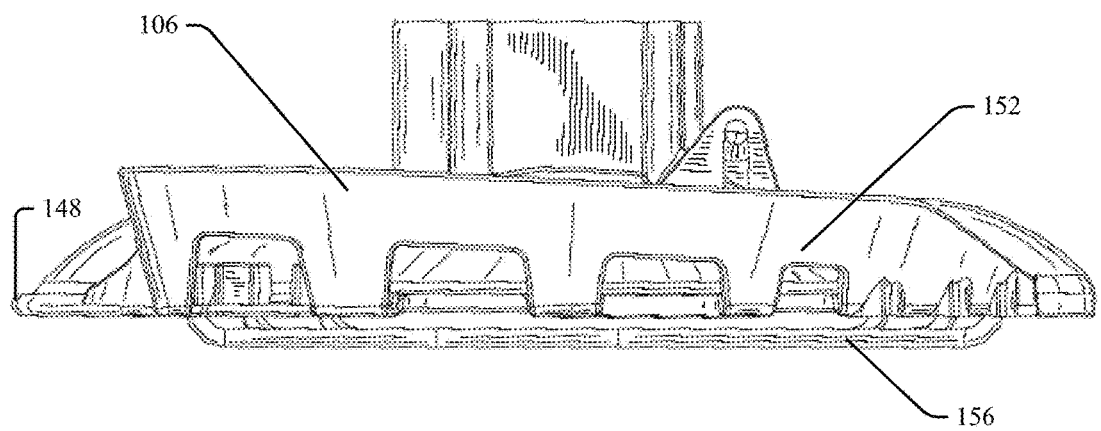

FIGS. 8A and 8C are right side views of example housings 106. FIGS. 8B and 8D are left side views of example housings 106. The guards 156 can be mounted to the housing 106 and positioned adjacent to the blade disk 102. The guards 156 can extend below the outer circumference 140 of the housing 106.

Figure 9A:
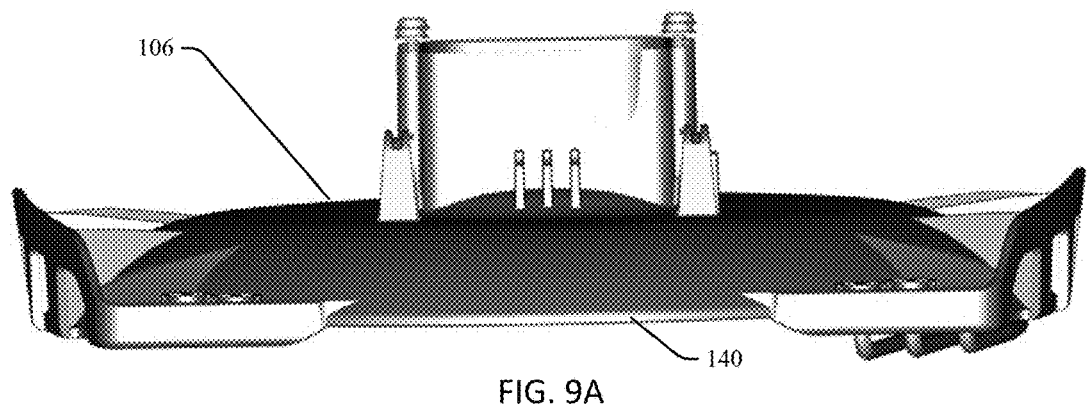
FIGS. 9A, 9B, 9C, and 9D are illustrations of example housings for a high-efficiency cutting system for an autonomous mower in accordance with an aspect of the disclosure.
Figure 9B:
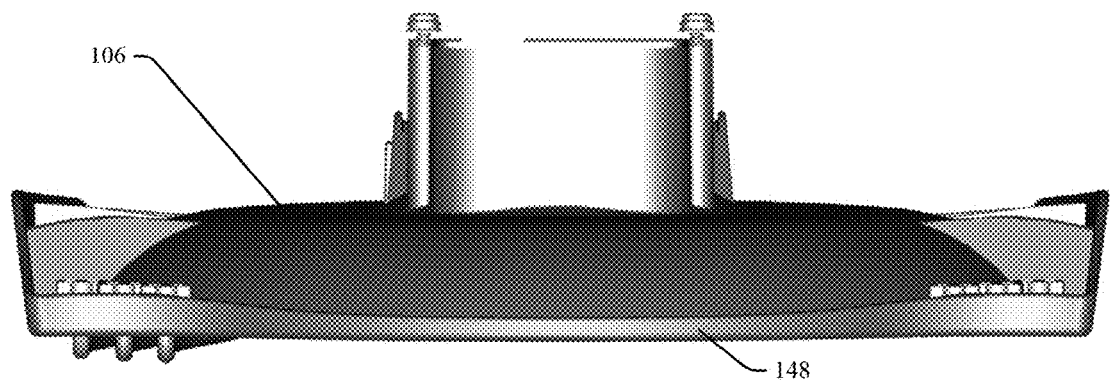
Figure 9C:
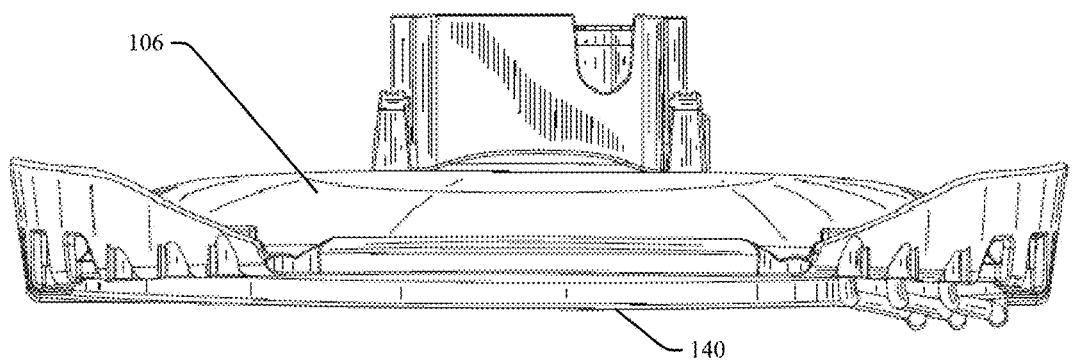
Figure 9D:
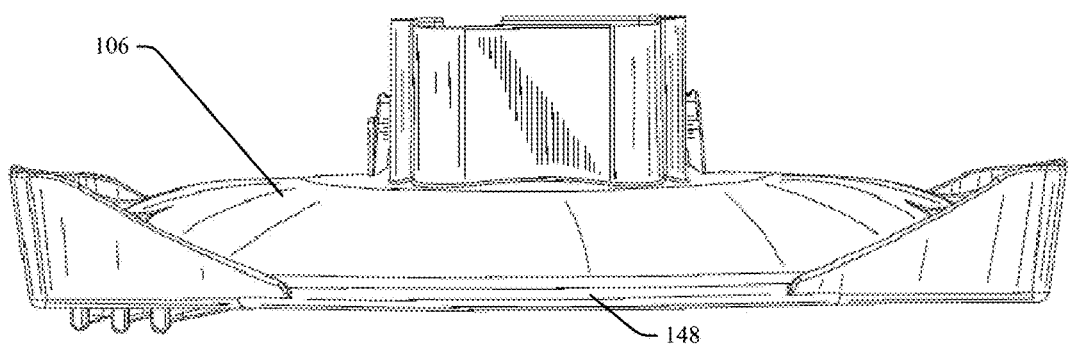

FIGS. 9A and 9C are rear views of example housings 106. FIGS. 9B and 9D are front views of example housings 106. The housing 106 includes a downwardly directed outer circumference 140. A front facing side 148 of the housing 106 is provided with integrally molded arched portions 150 at opposing ends.

Figure 11:
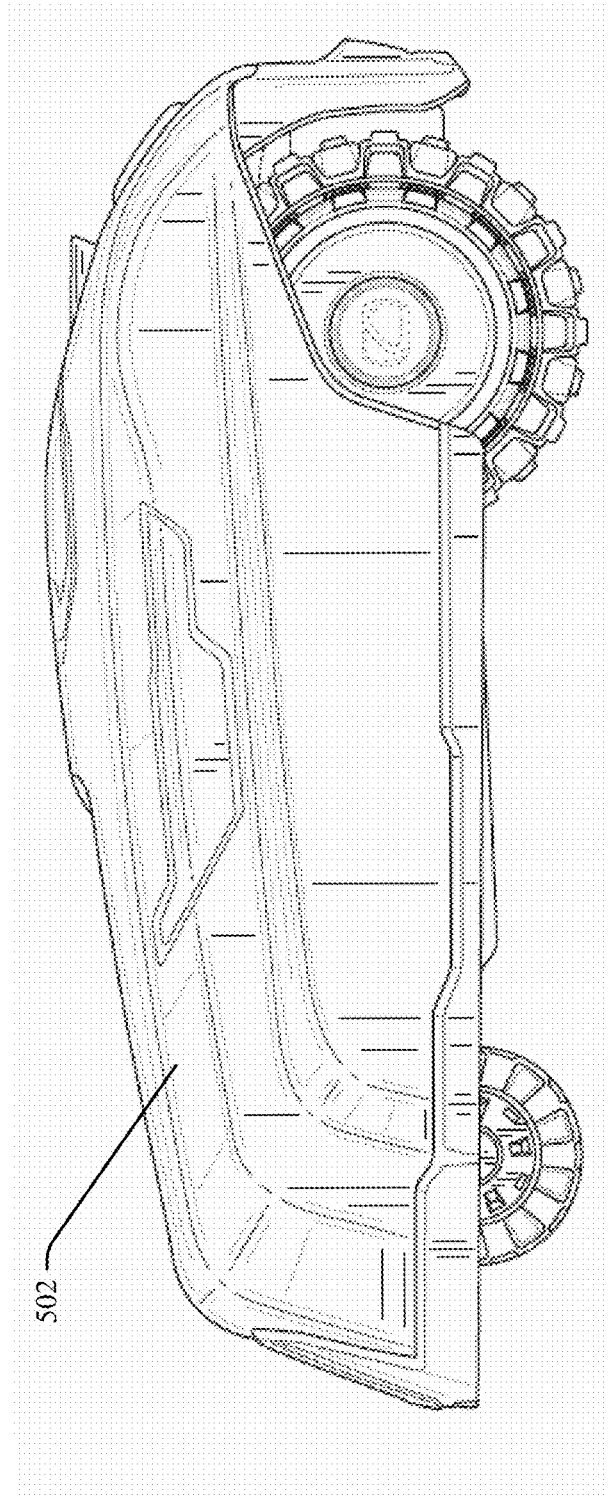
FIG. 11 is an illustration of an autonomous mower including an example high-efficiency cutting system in accordance with an aspect of the disclosure.

As shown in FIGS. 10A, 10B and FIG. 11, embodiments of a high-efficiency cutting system 100 are formed as an autonomous mower 500, wherein the autonomous mower 500 includes a body 502. One or more high efficiency cutting systems 100 can be located underneath the body 502 of the autonomous mower, and can be driven by most any suitable motor, or by multiple motors. In an embodiment, a single motor drives both the high-efficiency cutting system (s) 100, and the wheels of the autonomous mower 500. For example, the autonomous mower 500 and an associated high-efficiency cutting system 100 can be driven by a single battery powered electric motor. In another example, the autonomous mower 500 and an associated high-efficiency cutting system 100 can each be driven by its own dedicated electric motor 120.

Referring to FIGS. 10A and 10B, in an embodiment, the autonomous mower body 502 includes at least one standoff 504 or raised area. The standoff 504 may be integrally formed with the mower body 502, or the standoff 504 can comprise a separate part or parts removably attached to the mower body 502. The standoff 504 is located on an inner portion of the mower body and positioned so as to align with a vertical standoff 152 of the housing 106. The alignment of the standoff 504 and the vertical standoff 152 of the housing 106 lessens or prevents deformation of the mower body 502 when an external pressure is applied against the outer portion of the mower body 502, for example, a hand, foot or obstacle pressing against the mower body 502. In an embodiment, the standoff 504 works together with the vertical standoff 152 to provide increased safety at the area of the autonomous mower where the blades 104 are closest to the outer portion of the mower body 502, and preventing contact of a digit, e.g. finger, thumb, toe, extremity, or an obstacle, with the cutting blades 104.

The standoff 504 can be located and sized so that it contacts the vertical standoff 152 along its length such that the distance from the outer portion of the autonomous mower body 502 to the cutting blades is preserved for most any cut height. That is, as the cutting height is adjusted, and the blade disk is moved further from or closer to the work surface, the standoff 504 and the vertical standoff 152 retain their alignment and work together to provide sufficient support and resistance to prevent or reduce deformation of the mower body 502 and the housing 106, and maintaining a safe distance from the outer portion of the autonomous mower 500 to the cutting radii of the blades 104.

Figure 12A:
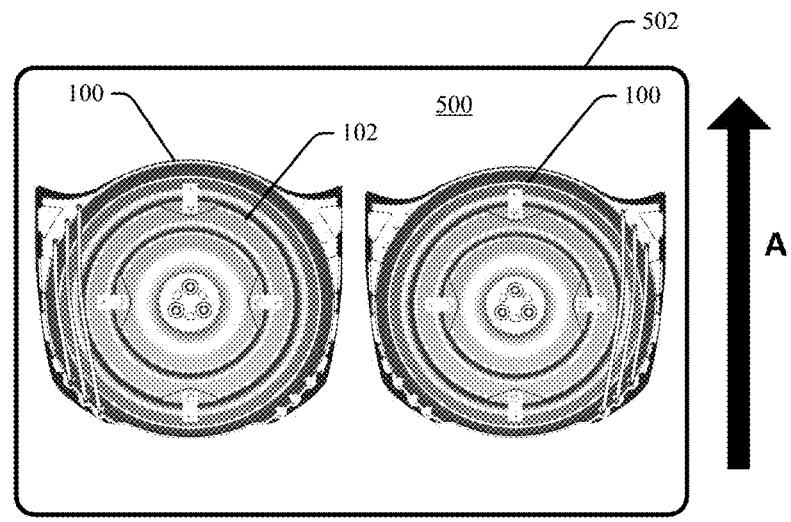
FIGS. 12A and 12B are illustrations of autonomous mowers including example high-efficiency cutting systems in accordance with aspects of the disclosure.
Figure 12B:
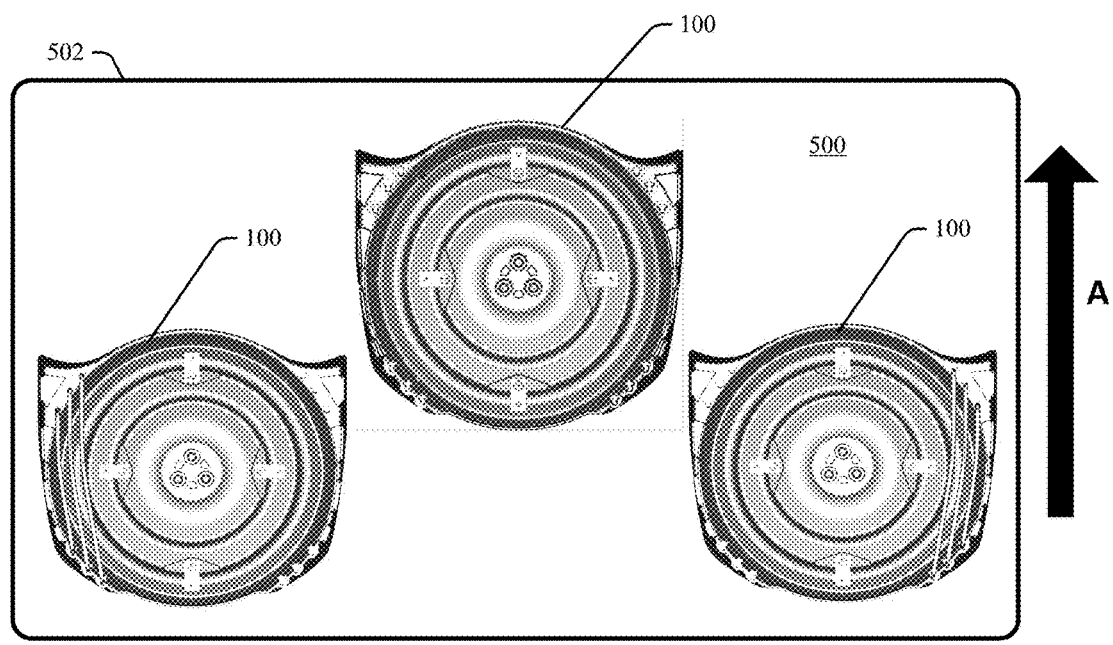

Referring to FIGS. 12A and 12B, an autonomous mower 500 can include a plurality of high-efficiency cutting systems 100, wherein the high efficiency cutting systems 100 are side-by-side relative to forward motion of the autonomous mower 500. In an embodiment, the autonomous mower 500 includes a mower body 502, and high efficiency cutting systems 100 positioned side-by-side relative to the forward movement of the autonomous mower 500 as indicated by the arrow A.

In other embodiments, an autonomous mower 500 can include a plurality of high efficiency cutting systems 100 arranged in a side-by-side, front-to-back, inline, offset, and/ or staggered configuration such that the effective grass cutting width of each high-efficiency cutting system 100 at least partially overlaps with the effective grass cutting width of an adjacent, and/or of another, high-efficiency cutting system 100 of the autonomous mower 500. Each high-efficiency cutting system 100 can include both a blade disk 102 and a housing 106 as shown, or multiple blade disks 102 can be accommodated within a single appropriately proportioned housing 106.

Embodiments of high-efficiency cutting systems 100 for an autonomous mower 500 has been disclosed, for example, alternative blade and/or blade disk configurations, blade locations, and blade and/or blade disk arrangements have been demonstrated. The effect of the spinning blade disk 102 on the grass blades is enhanced by the size, shape, position and configuration of the blade disk 102, and in particular the configuration of the blade disk bottom surface 112, together with the size, shape, placement and orientation of the blades 104, cut plane 168, cut circle plane 170, cut circle pitch 172, blade tip angle or pitch 174, and blade tip attachment height 176, all of which can contribute to the effectiveness of the presently disclosed high-efficiency cutting system.

In another embodiment, a high-efficiency cutting system 100 is formed as an element of a handheld implement such as a typical string trimmer. In this example, a guard can be placed around the exterior of a trimmer shell such that the blades cannot contact stationary objects such as fence posts, tree trunks, building foundations, etc. while trimming grass.

While embodiments have been described, it should be understood that the disclosed system is not so limited and modifications may be made without departing from the disclosed high-efficiency cutting system. The scope of the high-efficiency cutting system is defined by the appended claims, and all devices, processes, and methods that come within the meaning of the claims, either literally or by equivalence, are intended to be embraced therein.

The invention claimed is:

1. A cutting system for an autonomous mower comprising:
    a housing having an outer circumference including at least one vertical standoff, and an open lower portion;
    at least one rotating blade disk, provided within the housing and having a central portion, a top side, a bottom side, and a peripheral edge;
    a first pair of cutting blades pivotably secured to the bottom side of the blade disk between the central portion of the blade disk and the blade disk peripheral edge, and extending away from the blade disk at an angle; and
    a second pair of cutting blades pivotably secured to the bottom side of the blade disk radially inward and offset from the first pair of cutting blades, and extending away from the blade disk at an angle.

2. The cutting system for an autonomous mower of claim 1, wherein the at least one vertical standoff comprises a selectively thickened area of at least a portion of the outer circumference of the housing, and wherein the vertical standoff is configured to align with at least one standoff located on an inner surface of a body of the autonomous mower.

3. The cutting system for an autonomous mower of claim 1, wherein the blade disk bottom side comprises a plurality of concentric raised areas connected by curved portions.

4. The cutting system for an autonomous mower of claim 3, wherein the curved portions extend vertically above the central portion and the peripheral edge extends vertically below the concentric raised areas.

5. The cutting system for an autonomous mower of claim 1, wherein the housing outer circumference substantially surrounds the blade disk peripheral edge at a distance of between about 2 millimeters to 8 millimeters.

6. The cutting system for an autonomous mower of claim 1, wherein
    i. the housing outer circumference, or
    ii. the blade disk peripheral edge, or
    iii. the housing outer circumference and the blade disk peripheral edge,
    include projections that span the distance there between.

7. The cutting system for an autonomous mower of claim 1, the blade disk comprises a plurality of projections extending from the top side of the blade disk.

8. The cutting system for an autonomous mower of claim 1, wherein the first pair of cutting blades are mounted at about 180 degrees relative to each other.

9. The cutting system for an autonomous mower of claim 1, wherein the second pair of cutting blades are mounted at an angle of about 180 degrees relative to each other.

10. The cutting system for an autonomous mower of claim 1, wherein the first pair of cutting blades and the second pair of cutting blades are mounted at an angle of about 90 degrees relative to each other.

* * * * *